(12) United States Patent
Mori et al.

(10) Patent No.: US 6,683,674 B2
(45) Date of Patent: Jan. 27, 2004

(54) IMAGE RECORDING DEVICE

(75) Inventors: Nobufumi Mori, Kanagawa (JP);
Akinori Harada, Kanagawa (JP);
Shintaro Washizu, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 146 days.

(21) Appl. No.: 09/845,254

(22) Filed: May 1, 2001

(65) Prior Publication Data

US 2002/0003613 A1 Jan. 10, 2002

(30) Foreign Application Priority Data

May 1, 2000 (JP) ......................... 2000-132548

(51) Int. Cl.[7] ................. G03B 27/00; G03B 27/32; G03B 27/72; C09K 19/00; G02B 26/00
(52) U.S. Cl. .................. 355/405; 355/27; 355/35; 355/55; 355/67; 355/71; 430/20; 430/138; 430/168; 430/169; 359/290; 359/820; 359/855
(58) Field of Search .................. 355/405, 27, 35, 355/55, 67, 71; 430/20, 138, 168, 169, 350, 353; 359/290, 820, 855

(56) References Cited

U.S. PATENT DOCUMENTS

| 3,781,902 A | * | 12/1973 | Shim et al. |
| 4,430,415 A | * | 2/1984 | Aono et al. |
| 4,552,322 A | * | 11/1985 | Waugh |
| 4,864,352 A | * | 9/1989 | Morita |
| 4,985,346 A | * | 1/1991 | Suzuki |
| 4,990,931 A | * | 2/1991 | Sato et al. |
| 5,047,308 A | * | 9/1991 | Usami |
| 5,948,607 A | * | 9/1999 | Uchida et al. |
| 6,312,134 B1 | * | 11/2001 | Jain et al. |

FOREIGN PATENT DOCUMENTS

| JP | 4-211252 | 8/1992 | ........... G03F/7/004 |
| JP | 2000-199952 | 7/2000 | ........... G03F/7/004 |
| JP | 2001-142204 | 5/2001 | ........... G03F/7/004 |

OTHER PUBLICATIONS

Patent Abstracts of Japan 04–211252 Aug. 3, 1992.
Patent Abstracts of Japan 2000–199952 Jul. 18, 2000.

* cited by examiner

*Primary Examiner*—Frank G. Font
*Assistant Examiner*—Khaled Brown
(74) *Attorney, Agent, or Firm*—Sughrue Mion, PLLC

(57) ABSTRACT

There is provided an image recording device which is compact and free of waste materials, which has a completely dry system and a simplified exposure system, and which can carry out high speed image recording. The image recording device includes, within a housing of the image recording device, an accommodating section for accommodating a light and heat sensitive recording material; a light recording section for exposing the light and heat sensitive recording material, which is supplied from the accommodating section, with light to record a latent image; a heat developing section for developing the latent image by applying heat; a light fixing section for irradiating light to fix the developed image; and a discharging section for discharging the light and heat sensitive recording material having an image recorded thereon. Exposure is carried out by a plurality of LEDs provided at a light source section of an exposure unit of the light recording section.

26 Claims, 12 Drawing Sheets

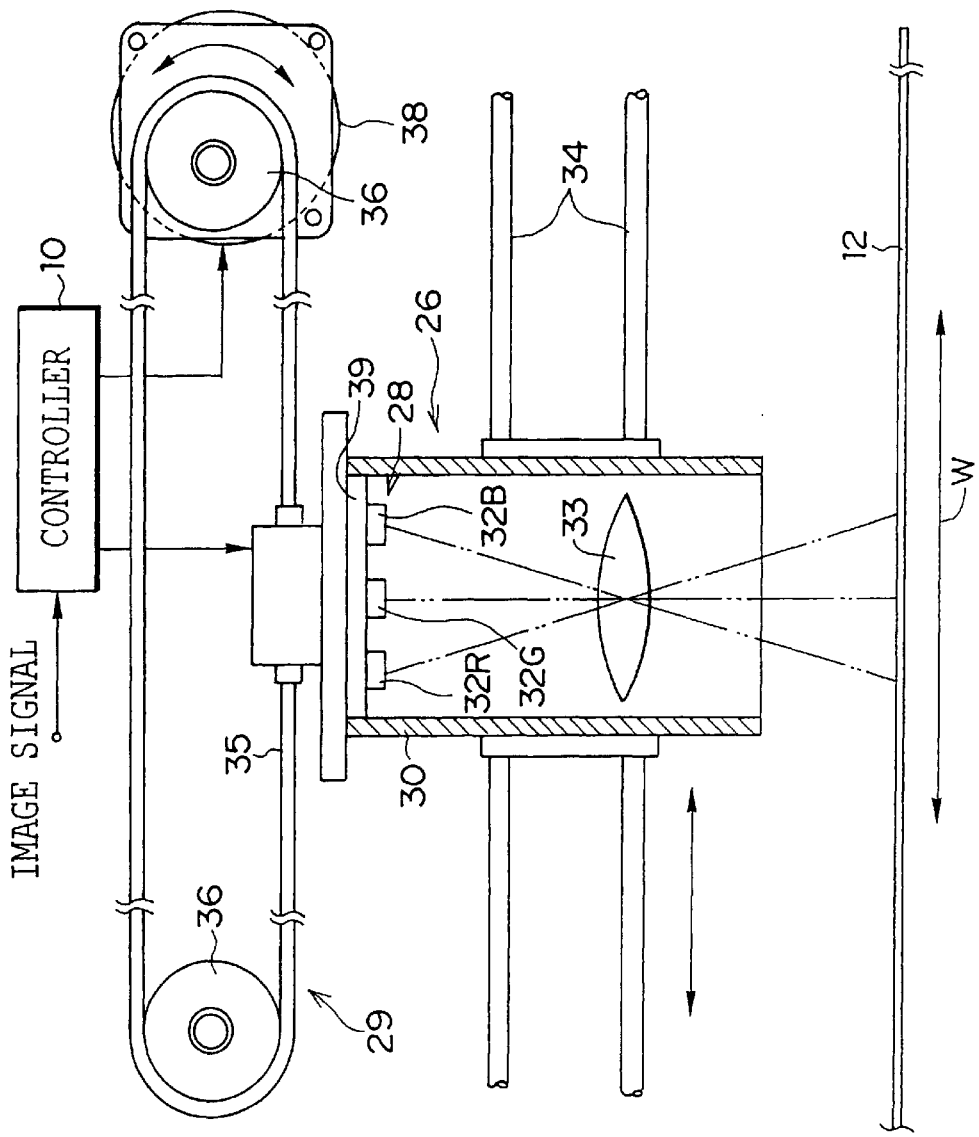

MAIN SCANNING DIRECTION

MAIN SCANNING DIRECTION

MAIN SCANNING DIRECTION

MAIN SCANNING DIRECTION

MAIN SCANNING DIRECTION

F I G. 8
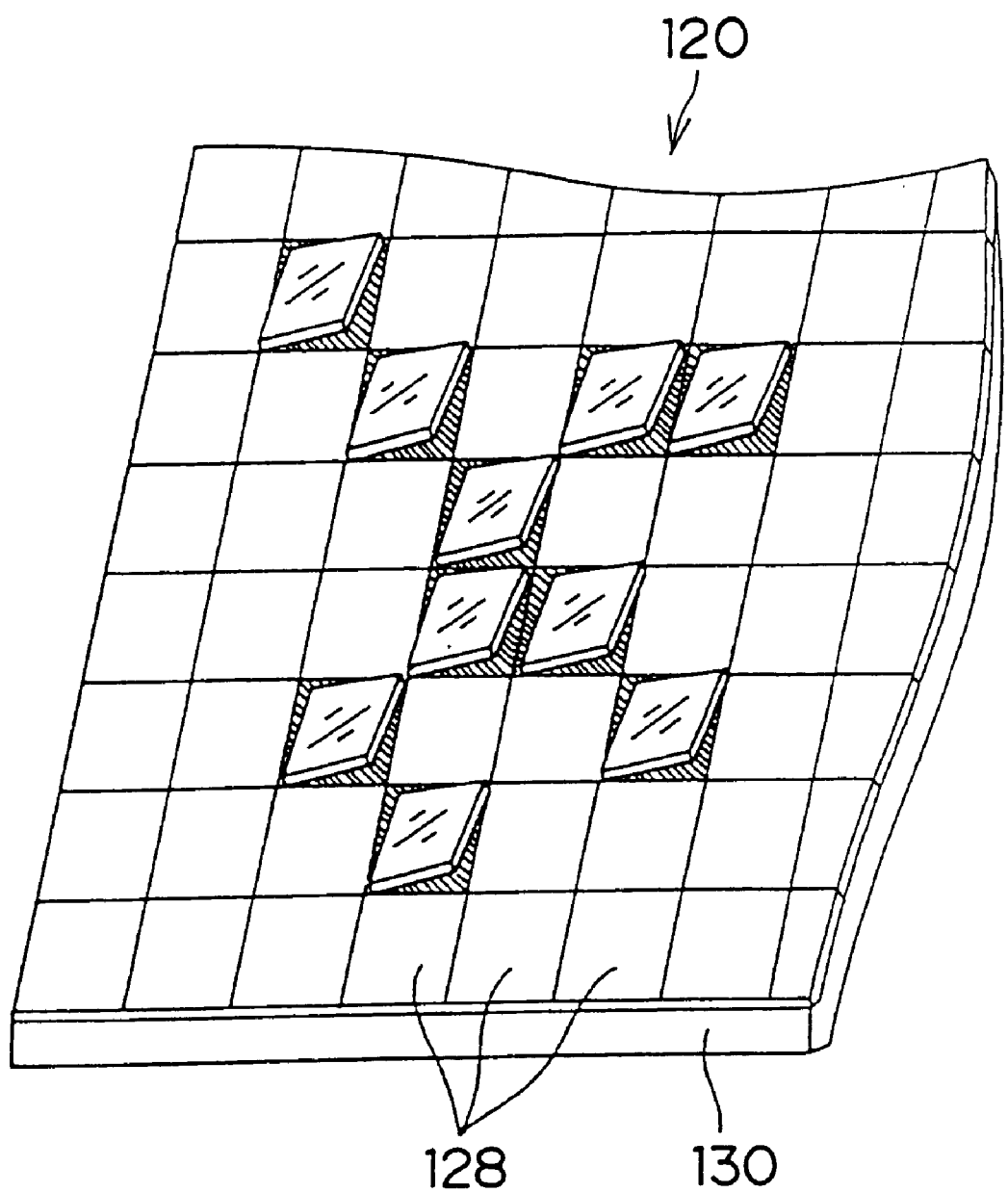

IMAGE RECORDING DEVICE

BACKGROUND OF THE INVENTION

1. Field of the Invention

The present invention relates to an image recording device, and in particular, to an image recording device which records an image onto a light and heat sensitive recording material.

2. Description of the Related Art

In conventional light recording systems such as silver halide photography, photographing is carried out by using a film such as a negative film, a positive film or the like. Image information recorded on a film which has been developed is optically printed onto a photographic printing paper, and the photographic printing paper is processed in processing solutions such that a print is obtained. A so-called color negative usually includes a layer which is exposed by blue light so as to form a yellow dye image, a layer which is exposed by green light to form a magenta dye image, and a layer which is exposed by red light so as to form a cyan dye image. At the time of developing processing, the developing agent is oxidized in a process in which the silver halide particles contained in the latent image are reduced into silver, and the dye image is formed by the reaction (coupling) of this oxidant and the coupler. The undeveloped silver halide and developed silver are removed by a bleaching fixing solution in a bleaching fixing process which follows the developing process. A color paper is exposed by light passing through the obtained negative dye image. The color paper is subjected to similar developing, bleaching and fixing processes such that a color print is obtained. As described above, the conventional light recording system is usually a wet process utilizing processing solutions, and there is the tendency for the size of the processing device to increase and processing costs to increase.

On the other hand, a simple and quick method utilizing heat development has been developed as a photosensitive material processing method utilizing silver halide. Products called PICTOGRAPHY and PICTROSTAT from Fuji Photo Film Co., Ltd. are known as examples of such a method. However, in such a heat developing method, dyes generated by heat development are transferred onto an image receiving material, and the receiving material is used as the print. A problem arises in that waste materials are generated.

In a completely dry system, in order to form an image recording system which does not generate waste materials, attention has been paid to a monosheet-type light and heat sensitive recording material which is such that the recording material is exposed by light such that a latent image is formed, and this latent image is developed by heat. The exposure is carried out by a digital exposure system.

Various types of conventional image recording devices equipped with digital exposure systems have been developed. Generally, in a digital exposure system, a light beam emitted from a semiconductor laser is modulated by image data. By rotating a polygon mirror at high speed, the light beam is deflected (main scanning), and the light beam reflected by the polygon mirror such as a galvano mirror or the like is subscanned, or main scanning is repeated while the recording medium is moved in a subscanning direction (or while the recording medium is step-moved). In this way, an image is recorded on the recording medium.

However, generally, when a complex scanning exposing system using a polygon mirror and the like is used, a problem arises in that the device becomes large. Further, the light and heat sensitive recording material has a low sensitivity to light as compared with that of a conventional photosensitive material using silver halide. Thus, problems arise in that it is difficult to make the scanning speed faster, and the recording time becomes long.

SUMMARY OF THE INVENTION

The present invention was developed in order to overcome the above-described drawbacks, and an object of the present invention is to provide an image recording device which is a completely dry system, which does not generate waste materials, whose exposure system is simple, and which is compact. Another object of the present invention is to provide an image recording device which can carry out image recording at high speed. In order to achieve the above-described objects, a first aspect of the present invention is an image recording device for recording an image onto a light and heat sensitive recording material, the device comprising: (a) a conveying mechanism which conveys a light and heat sensitive recording material in a predetermined direction; (b) a light recording section including an exposure light source including a plurality of light emitting points aligned along a direction substantially orthogonal to the predetermined direction, the light recording section subjecting the light and heat sensitive recording material to light from the exposure light source to form a latent image on the light and heat sensitive recording material; (c) a heat development section which develops the latent image of the light and heat sensitive recording material by heating the light and heat sensitive recording material; and (d) a light fixing section for fixing the developed image of the light and heat sensitive recording material by irradiating light onto the light and heat sensitive recording material.

In the first aspect of the present invention, when the light and heat sensitive recording material is supplied from the accommodating section, the light and heat sensitive recording material is conveyed in the subscanning direction by a conveying means. At the light recording section, the light and heat sensitive recording material is exposed such that a latent image is recorded thereon, and the latent image is developed by heat at the heat developing section. Then, at the light fixing section, light is illuminated such that the developed image is fixed. In this way, developing is carried out by heat development, and the developed image is fixed by light fixing in which light is illuminated. Thus, processing solutions and image receiving members are not needed. Accordingly, in accordance with this image recording device, images can be recorded by a completely dry system, and no waste materials are generated at the time of image recording.

Further, in the first aspect of the present invention, at the light recording section, the light and heat sensitive recording material is conveyed by the conveying means in the subscanning direction. The light and heat sensitive recording material is exposed by the exposure light source which is provided with a large number of light emitting points which are aligned in the main scanning direction. A latent image is thereby recorded on the light and heat sensitive recording material. Therefore, there is no need to use a complex exposure system equipped with a polygon mirror or the like, and the device can be made compact. High speed image recording can be carried out without using a mechanism which moves the light emitting points.

The exposure light source can be formed by a self-luminous element. A light emitting diode, an inorganic or organic electroluminescent element, a semiconductor laser, a fluorescent display element or the like can be used as the self-luminous element. Further, the exposure light source can be formed by a light source and a transmittance converting element. A liquid crystal or a transmissive ferroelectric ceramic (such as PLZT) array or the like can be used as the transmittance converting element.

A second aspect of the present invention is an image recording device for recording an image corresponding to an image signal, onto a light and heat sensitive recording material, the device comprising: (a) a light recording section including a light source and a micromirror array comprising a plurality of micromirrors, the micromirrors including adjustable angles of reflection, which the light recording section adjusts on the basis of an image signal for exposing a light and heat sensitive recording material to form a latent image on the light and heat sensitive recording material corresponding to the image signal; (b) a heat developing section which subjects the light and heat sensitive recording material to heat to develop the latent image of the light and heat sensitive recording material; and (c) a light fixing section which irradiates the developed image of the light and heat sensitive recording material to fix the developed image.

In the second aspect of the present invention, a micromirror array is used. By adjusting the angles of reflection of the micromirrors on the basis of an image signal, the light and heat sensitive recording material supplied from the accommodating section is exposed such that a latent image is recorded thereon. Therefore, there is no need to move the light source in the main scanning direction and the subscanning direction, and exposure can be carried out without using a large number of light emitting points. Further, there is no need to use a complex exposure system equipped with a polygon mirror or the like. The device can be made compact, and high speed image recording can be carried out.

A third aspect of the present invention is an image recording device for recording an image onto a light and heat sensitive recording material, the device comprising: (a) an accommodating section which accommodates a light and heat sensitive recording material; (b) a discharging section which discharges the light and heat sensitive recording material for which recording has been completed; (c) a conveyer, including conveying path joining the accommodating section and the discharging section, and along which the conveyers conveys light and heat sensitive recording material from the accommodating section to the discharging section; (d) a light recording section provided between the accommodating section and the discharging section, and positioned to oppose the light and heat sensitive recording material along at least a portion of the conveying path; (e) a heat developing section provided between the light recording section and the discharging section, provided to oppose at least one side of the conveying path; and (f) a light fixing section provided between the heat developing section and the discharging section, provided to oppose the light and heat sensitive recording material along at least a section of the conveying path.

A recording material which uses a composition which is hardened by light can be used as the light and heat sensitive recording material. In a case in which such a light and heat sensitive recording material is used, by exposing the recording material by light passing through or reflected from an image original, or by exposing the recording material by a light scanning modulated by image data, the composition, which is contained in the recording material and which is hardened by light, is exposed and is photocured, so that a latent image is formed. Thereafter, by heating the recording material, the components which are involved in color formation or decoloring of the non-hardened portions move into the recording material in accordance with the latent image, such that a color image is formed. Further, by illuminating light onto the surface of the recording material, the formed image is hardened and fixed, and the unneeded coloring components are decolored. This image recording method is useful not only in the case of recording a black-and-white image, but also in the case of recording a color image. Light and heat sensitive recording materials provided with the following light and heat sensitive recording layers (a) through (f) can be used as the light and heat sensitive recording material.

(a) A light and heat sensitive recording layer containing a color forming component A encapsulated in heat-responsive microcapsules; and a photopolymerizable composition which is present outside of the heat-responsive microcapsules and which contains at least: a substantially colorless compound B which has in the same molecule a polymerizable group and a region which forms color upon reaction with the color forming component A, and a photopolymerization initiator.

(b) A light and heat sensitive recording layer containing a color forming component A encapsulated in heat-responsive microcapsules; and a photopolymerizable composition which is present outside of the heat-responsive microcapsules and which contains at least: a substantially colorless compound C which forms color upon reaction with the color forming component A, a photopolymerizable compound D, and a photopolymerization initiator.

(c) A light and heat sensitive recording layer containing a color forming component A encapsulated in heat-responsive microcapsules; and a photopolymerizable composition which is present outside of the heat-responsive microcapsules and which contains at least: a substantially colorless compound C which forms color upon reaction with the color forming component A, a photopolymerizable compound Dp which has a region which suppresses reaction of the color forming component A and the compound C, and a photopolymerization initiator.

(d) A light and heat sensitive recording layer containing a substantially colorless compound C which is encapsulated in heat-responsive microcapsules and which forms color upon reaction with the color forming component A; and a photopolymerizable composition which is present outside of the heat-responsive microcapsules and contains at least: a color forming component A, a photopolymerizable compound D, and a photopolymerization initiator.

(e) A light and heat sensitive recording layer containing an oxidant precursor E encapsulated in heat-responsive microcapsules, and outside of the heat-responsive microcapsules, an activating agent G which reacts with the oxidant precursor E to generate an oxidant F, and a dye forming coupler H which participates in a coupling reaction with the oxidant F to form a dye, the light and heat sensitive recording layer being a photocurable layer whose illuminated portions are hardened by illumination of light.

(f) A light and heat sensitive recording layer containing an oxidant precursor E outside of heat-responsive microcapsules, and encapsulated within the heat-responsive microcapsules, an activating agent G which reacts with the oxidant precursor E to generate an oxidant F, and a dye forming coupler H which participates in a coupling reaction with the oxidant F to form a dye, the light and heat sensitive recording layer being a photocurable layer whose illuminated portions are hardened by illumination of light.

BRIEF DESCRIPTION OF THE DRAWINGS

FIG. 2 is a schematic view showing a structure of a light recording section of the image recording device relating to the first embodiment.

FIG. 8 is an partial enlarged view showing a structure of a portion of a micromirror array.

DETAILED DESCRIPTION OF THE PREFERRED EMBODIMENTS

Hereinafter, with reference to the drawings, embodiments will be described in which the present invention is applied to an image recording device which records an image by using a color light and heat sensitive recording material in which are layered on a support three single-color light and heat sensitive recording layers (hereinafter occasionally referred to as "recording layers") which respectively form hues of yellow, magenta, and cyan.
(First Embodiment)

Figure 1:
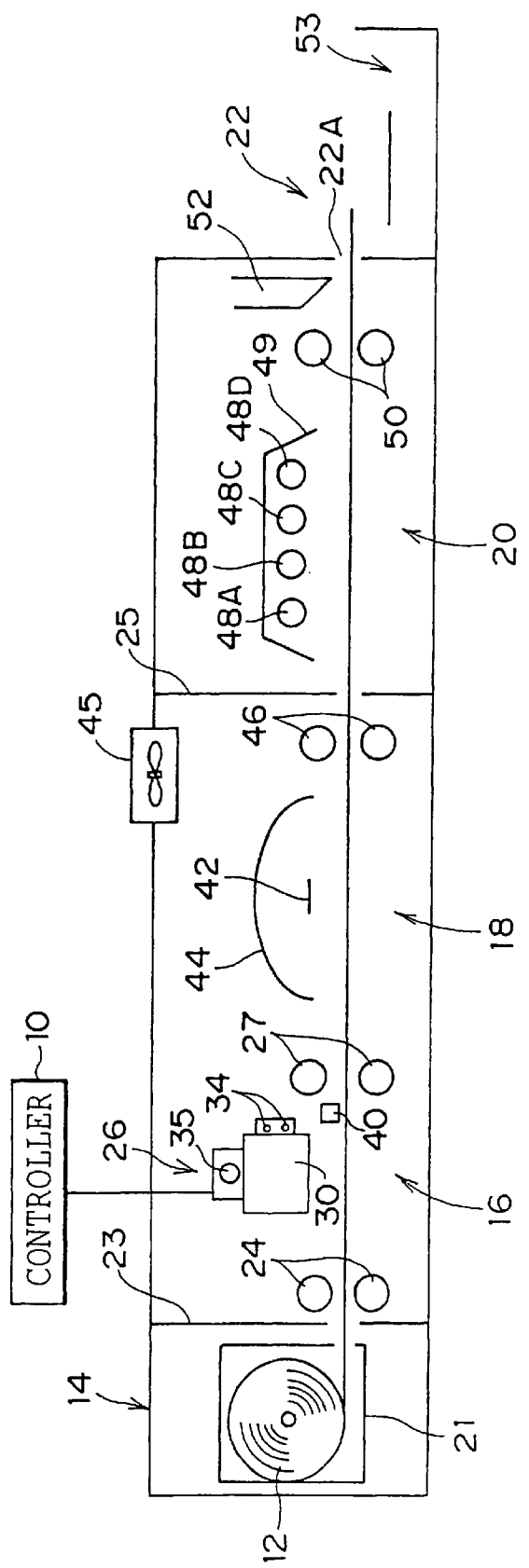
FIG. 1 is a schematic view showing a structure of an image recording device relating to a first embodiment.

FIG. 1 shows the schematic structure of an image recording device relating to a first embodiment, which utilizes a light and heat sensitive recording material 12 which is wound in roll form. As shown in FIG. 1, an accommodating section 14 which accommodates the light and heat sensitive recording material 12, a light recording section 16 which exposes the light and heat sensitive recording material 12 which has been supplied from the accommodating section 14 so as to record a latent image thereon, a heat developing section 18 which develops the latent image by heating, a light fixing section 20 which irradiates light to fix the developed image, and a discharging section 22 through which is discharged the light and heat sensitive recording material 12 on which the image is recorded, are provided at the interior of a housing of the image recording device. The accommodating section 14, the light recording section 16, the heat developing section 18, the light fixing section 20 and the discharging section 22 are disposed in that order along the horizontal direction.

Conveying roller pairs 24, 27, 46, 50, which nip and convey the light and heat sensitive recording material 12, are disposed between these respective sections. A conveying path for conveying the light and heat sensitive recording material 12 from the accommodating section 14 toward the discharging section 22 is formed by these conveying roller pairs 24, 27, 46, 50. Further, the conveying roller pairs 24, 27, 46, 50 are connected to a conveying driving section (not shown), and are respectively driven by the conveying driving section. Note that the conveying driving section is controlled by a controller 10 which will be described later.

The accommodating section 14 and the light recording section 16 are separated by a partitioning plate 23 in which a pass-through opening for the light and heat sensitive recording material 12 is formed. The heat developing section 18 and the light fixing section 20 are separated by a partitioning plate 25 in which a pass-through opening for the light and heat sensitive recording material 12 is formed. Further, a discharge opening 22A for discharging the light and heat sensitive recording material 12 to the exterior is provided at the discharging section 22. A cutter 52, which cuts the light and heat sensitive recording material 12 into the respective image formed regions, is provided in a vicinity of the discharge opening 22A within the light fixing section 20.

A magazine 21, which accommodates the light and heat sensitive recording material 12 which is wound in a roll form such that the recording layer side thereof is directed inwardly, is accommodated in the accommodating section 14. The pair of conveying rollers 24 are disposed at the light recording section 16 side of the pass-through opening formed in the partitioning plate 23. Due to the pair of conveying rollers 24 rotating while nipping the light and heat sensitive recording material 12, the light and heat sensitive recording material 12 is pulled out from the magazine 21 in the accommodating section 14 with the recording layer side thereof facing upward, and is conveyed along the predetermined conveying path and supplied to the light recording section 16 which is disposed at the conveying direction downstream side.

The light recording section 16 is provided with an exposure unit 26 which is disposed above the conveying path. The exposure unit 26 is connected to the controller 10. As shown in FIG. 2, image signals read from an image processing device (not shown) are stored in the controller 10. A light source section 28 within the exposure unit 26 is controlled so as to be lit in accordance with the image signals. The exposure unit 26 is movable in the transverse direction of the light and heat sensitive recording material 12 (the main scanning direction) by a main scanning unit 29.

Figure 3A:
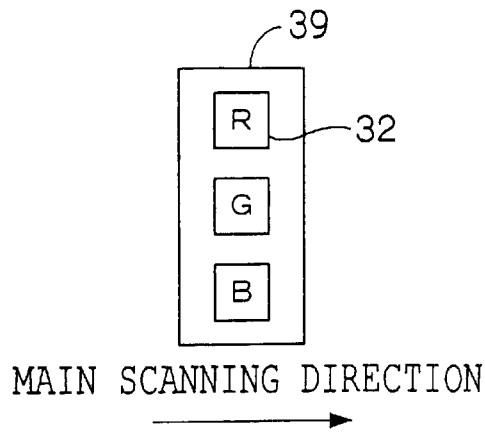
FIGS. 3A through 3E are diagrams showing arrangements of LEDs in the light recording section of the image recording device relating to the first embodiment.
Figure 3B:
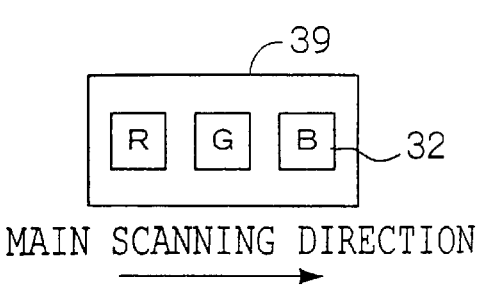

As shown in FIG. 2, the exposure unit 26 is covered by a box-shaped exposure casing 30. The light source section 28 is disposed at the upper end surface of the exposure casing 30, such that the light emitting surface of the light source section 28 faces toward the conveying path side. Further, at the light source section 28, plural light emitting diodes (LEDs), which are formed from LEDs 32B, 32G, 32R which emit light of R (red), G (green), and B (blue) colors respectively, are mounted onto a substrate 39 along the transverse direction of the light and heat sensitive recording material 12 (the main scanning direction), in accordance with a predetermined arrangement rule. In the present embodiment, as shown in FIG. 3A, three color LEDs which are the LEDs 32R, 32G, 32B are mounted to the substrate 39 in one row along the subscanning direction in the order of RGB. Further, as shown in FIG. 3B, the plural LEDs which are the LEDs 32R, 32G, 32B maybe arranged in one row in the order of RGB along the main scanning direction. Further, a plurality of the aforementioned RGB rows may be aligned in the main scanning direction or the subscanning direction.

Figure 3C:
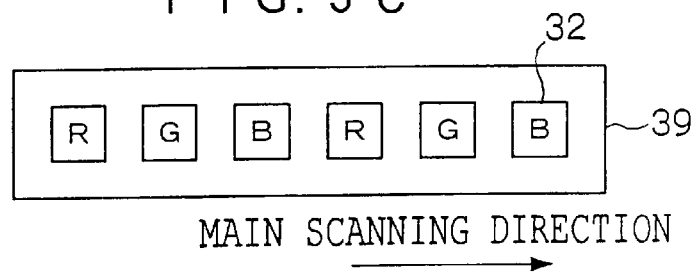
Figure 3D:
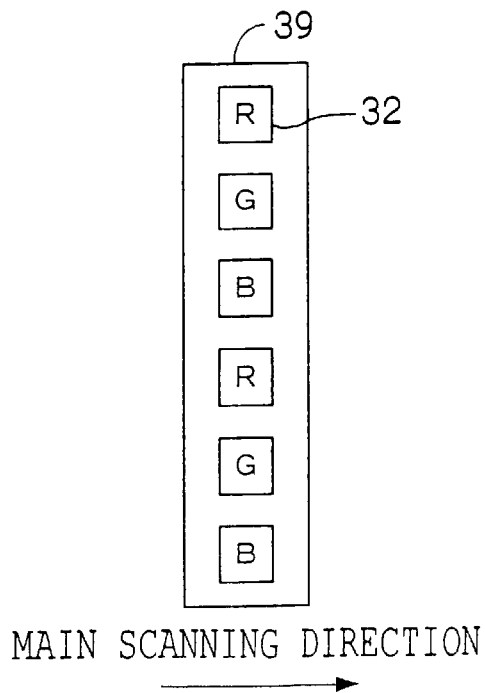
Figure 3E:
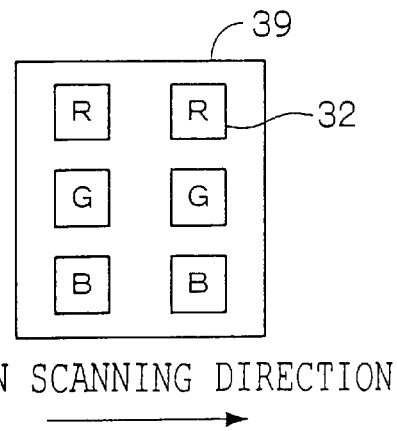

For example, as shown in FIG. 3C, two groups can be aligned in the main scanning direction, with each group being three LEDs (the LEDs 32R, 32G, 32B) which are aligned in the order of RGB along the main scanning direction. Or, as shown in FIG. 3D, two groups can be aligned along the subscanning direction, with each group being three LEDs (the LEDs 32R, 32G, 32B) which are aligned in the order of RGB along the subscanning direction. As shown in FIG. 3E, two groups can be aligned in the main scanning direction, with each group being three LEDs (the LEDs 32R, 32G, 32B) which are aligned in the order of RGB along the subscanning direction. In a case in which a plurality of LEDs are aligned in the subscanning direction, the intervals between the scanning lines can be made narrow by setting the row at a slight incline with respect to the subscanning direction.

Further, the LEDs 32R, 32G, 32B may be LEDs having maximum intensities in the wavelength range of from 300 to 1100 nm. Because there are no appropriate light sources with wavelengths shorter than 300 nm, an inexpensive system cannot be formed. Even if a light source of a wavelength longer than 1100 nm is used, light and heat sensitive recording materials having sensitivity to wavelengths longer than 1100 nm are usually unstable, and it is difficult to design a light and heat sensitive recording material which is stable over a long period of time. The LEDs 32R, 32G, 32B can be appropriately selected from LEDs having maximum intensities at wavelengths which are selected from the wavelength range of 300 to 500 nm, the wavelength range of 450 to 700 nm, and the wavelength range of 550 to 1100 nm. In the present embodiment, for example, a red LED 32R having a central wavelength of 655 nm, a green LED 32G having a central wavelength of 520 nm, and a blue LED 32B having a central wavelength of 465 nm are used.

A lens 33 is disposed at the light emitting surface side of the light source section 28. The lens 33 collects the light from the light source section 28, and focuses the light onto the light and heat sensitive recording material 12. The exposure unit 26 is supported by a pair of parallel guide shafts 34 which form a portion of the main scanning unit 29. The guide shafts 34 are disposed along the transverse direction (the direction of arrow W in FIG. 2) of the light and heat sensitive recording material 12. The exposure unit 26 is guided by the guide shafts 34 so as to be movable along the transverse direction of the light and heat sensitive recording material 12.

The exposure casing 30 is fixed to an endless belt 35. The endless belt 35 is trained about sprockets 36 positioned in vicinities of the both ends of the guide shafts 34. The rotating shaft of one of the sprockets 36 is connected to the rotating shaft of a motor 38. Due to the motor 38 rotating reciprocally, the exposure unit 26 is moved reciprocally in the main scanning direction along the guide shafts 34. The driving of the motor 38 is controlled by the controller 10 in accordance with the conveying speed of the light and heat sensitive recording material 12.

The maximum illumination light amount onto the surface of the light and heat sensitive recording material 12 is preferably 0.01 to 50 mJ/cm$^2$, and more preferably 0.05 to 10 mJ/cm$^2$. When the maximum illumination light amount is greater than 50 mJ/cm$^2$, the exposure time is long which makes the system less convenient, and the light source is large and the system is more expensive. On the other hand, in consideration of the usual sensitivity of the light and heat sensitive recording material 12, the maximum illumination light amount must be greater than or equal to 0.01 mJ/cm$^2$. Even if the light and heat sensitive recording material 12 is a high sensitivity light and heat sensitive recording material, if the maximum illumination light amount is less than 0.01 mJ/cm$^2$, light shading equipment to block light from the exterior is required, such that the cost of the system increases.

The pair of conveying rollers 27 is disposed at the conveying direction downstream side of the light recording section 16. The light and heat sensitive recording material 12 is nipped by the pair of conveying rollers 27, is conveyed along the conveying path, and is supplied to the heat developing section 18 disposed downstream in the conveying direction.

At the light recording section 16, a light spot is focused on the light and heat sensitive recording material 12 by the light source section 28 having the above-described structure. Due to the exposure unit 26 moving in the transverse direction of the light and heat sensitive recording material 12, the light and heat sensitive recording material 12 is main scanned, and along with this conveying, is subscanned in the direction opposite to the conveying direction. In this way, the light and heat sensitive recording material 12 is exposed from the recording layer side thereof, and a latent image is recorded thereon.

The heat developing section 18 is formed by a far infrared heater 42 and a reflecting plate 44. The far infrared heater 42 is disposed above the conveying path and serves as a heating device which heats the exposure surface side of the light and heat sensitive recording material 12. The reflecting plate 44 is disposed at the rear of the far infrared heater 42, and reflects the far infrared rays emitted from the heater toward the light and heat sensitive recording material 12. The far infrared heater 42 is controlled by a temperature control device (not shown) on the basis of output data from a temperature sensor (not shown) provided in a vicinity of the light and heat sensitive recording material 12, such that the light and heat sensitive recording material 12 can be heated to a predetermined temperature. At the heat developing section 18, the light and heat sensitive recording material 12 is heated to a predetermined temperature by the far infrared heater 42, such that the latent image recorded on the light and heat sensitive recording material 12 is developed.

The heating temperature is a temperature which is greater than or equal to the developing temperature of the light and heat sensitive recording material 12. A range of 50 to 200° C. is preferable, and a range of 90 to 140° C. is even more preferable. If the heating temperature is less than 50° C., at a light and heat sensitive recording material 12 whose developing temperature is less than 50° C., the storability of the photosensitive material before exposure markedly deteriorates, and thus, design of such a light and heat sensitive recording material is difficult. In contrast, if the developing temperature is higher than 200° C., the support of the light and heat sensitive recording material is deformed by the heat such that the dimensional stability cannot be ensured. Moreover, the heating temperature is controlled such that the range of variation with respect to the set temperature is within ±5° C. The light and heat sensitive recording material is a system having a relatively broad permissible range with respect to temperature fluctuations, and the properties thereof can be ensured even within ±5° C.

A ventilation device 45, which is for removing transpiration of water or the like generated at the time of heat developing, is provided at the conveying direction downstream side of and above the far infrared heater 42. The transpiration generated at the time of heat development is sucked-in, and the transpiration is adsorbed and removed by a gas adsorption filter provided at the interior thereof.

The pair of conveying rollers 46 are disposed at the conveying direction downstream side of the heat developing section 18. The light and heat sensitive recording material 12 is nipped by the pair of conveying rollers 46, is conveyed along the conveying path, and is supplied to the light fixing section 20 disposed at the conveying direction downstream side.

The light fixing section 20 is formed from fixing light sources 48A, 48B, 48C, 48D, which illuminate light toward the image formed surface of the light and heat sensitive recording material 12 which has been developed, and a reflecting plate 49 provided behind the fixing light sources 48A, 48B, 48C, 48D. The fixing light sources 48A, 48B, 48C, 48D are disposed above the conveying path. At the light fixing section 20, the light and heat sensitive recording material 12 is illuminated by light from the fixing light sources 48A, 48B, 48C, 48D, such that the developed image is fixed.

Other than a white light source such as a fluorescent light or the like, any of various light sources such as an LED, a halogen lamp, a cold cathode tube, a laser or the like, can be used as the fixing light source 48. It suffices for the illumination intensity of the illuminated portions of the light and heat sensitive recording material 12 to be in a range which provides the light intensity required for fixing. Basically, the illumination intensity is selected in accordance with the characteristics of the light and heat sensitive recording material 12, and a range of 10,000 to 50,000,000 lux is preferable, and a range of 20,000 to 6,000,000 lux is more preferable. When the illumination intensity is less than 10,000, the light fixing ability (the light decoloring ability) is insufficient. With a system requiring an illumination intensity of more than 50,000,000 lux, the device becomes large and expensive and is inconvenient.

The pair of conveying rollers 50 is disposed at the conveying direction downstream side of the light fixing section 20. The light and heat sensitive recording material 12 which has been subjected to light fixing is nipped by the pair of conveying rollers 50, is conveyed along the conveying path, and is supplied to the discharging section 22 disposed at the conveying direction downstream side.

A discharge tray 53 is provided at the outer side of the discharge opening 22A of the discharging section 22. The light and heat sensitive recording material 12, which is in a strip-like form and which has undergone the series of processings of exposure, development and fixing, is cut by the cutter 52 provided in a vicinity of the discharge opening 22A within the light fixing section 20, such that a single print is formed and discharged into the discharge tray 53 from the discharge opening 22A.

In this device, all of the processes of the light recording onto the light and heat sensitive recording material, the heat developing, and the light fixing can be carried out within a single device. Moreover, in this device, developing is carried out by heat development, and the developed image is fixed by light fixing. Thus, no processing solutions are required, and the system can be made to be a completely dry system. An image receiving material and the like are not needed, and no waste materials are generated.

Moreover, because a plurality of LEDs are provided at the light source section of the exposure unit of the light recording section, there is no need to use a complicated exposure system equipped with a polygon mirror or the like. The device can be made compact, and high speed image recording can be carried out.

(Second Embodiment)

Figure 4:
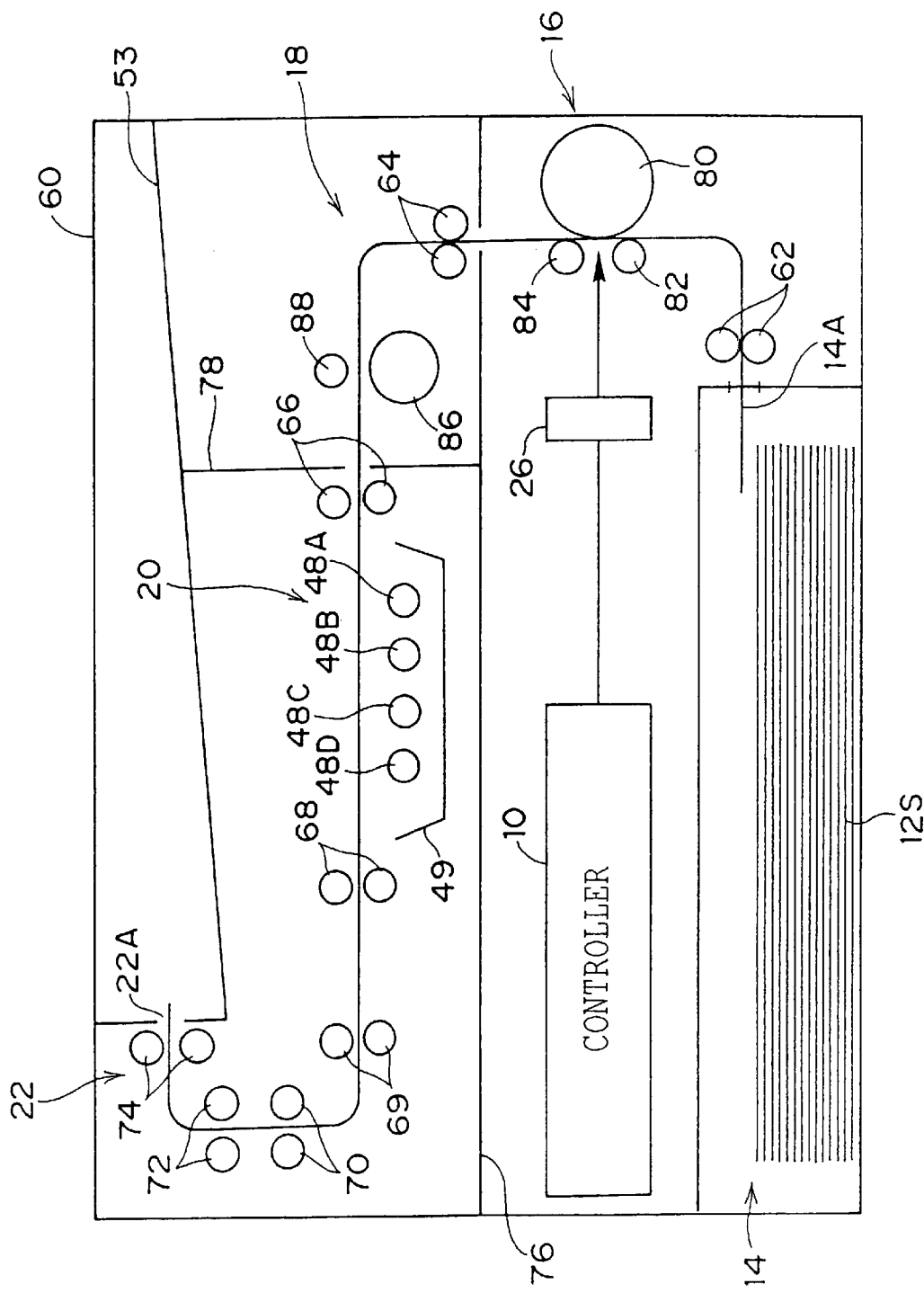
FIG. 4 is a schematic view showing a structure of an image recording device relating to a second embodiment.

FIG. 4 shows the schematic structure of an image recording device relating to a second embodiment which uses a sheet-shaped light and heat sensitive recording material 12S. As shown in FIG. 4, at the interior of the housing of the image recording device are provided the cassette-type accommodating section 14 which accommodates the light and heat sensitive recording materials 12S, the light recording section 16 which exposes the light and heat sensitive recording material 12S which has been supplied from the accommodating section 14 so as to record a latent image, the heat developing section 18 which develops the latent image by heating, the light fixing section 20 which illuminates light so as to fix the developed image, and the discharging section 22 which discharges the light and heat sensitive recording material 12S on which the image has been formed. The light recording section 16 is disposed above the accommodating section 14. The heat developing section 18 and the light fixing section 20 are disposed above the light recording section 16. The discharging section 22 is disposed above the light fixing section 20.

Conveying roller pairs 62, 64, 66, 68 through 74 are disposed between these respective sections. These conveying roller pairs 62, 64, 66, 68 through 74 form a bent conveying path for conveying the light and heat sensitive recording material 12S from the accommodating section 14 toward the discharging section 22. The conveying roller pairs 62, 64, 66, 68 through 74 are connected to a conveying driving section (not shown), and are respectively driven by this conveying driving section. The conveying driving section is controlled by the controller 10 which will be discussed later.

The accommodating section 14, the light recording section 16, and other sections are partitioned by a partitioning plate 76 in which is formed a pass-through hole for the light and heat sensitive recording material 12S. The heat developing section 18 and the light fixing section 20 are separated by a partitioning plate 78 in which is formed a pass-through hole for the light and heat sensitive recording material 12S. Moreover, the discharge opening 22A for discharging the light and heat sensitive recording material 12S to the exterior is provided at the discharging section 22.

A large number of the sheet-shaped light and heat sensitive recording materials 12S are accommodated in a stacked state in the cassette-type accommodating section 14, with the recording layer sides of the light and heat sensitive recording materials 12S facing upward. A removal opening 14A for the light and heat sensitive recording materials 12S is provided at the accommodating section 14. The pair of conveying rollers 62 are disposed at the light recording section 16 side of this removal opening 14A. Due to the pair of conveying rollers 62 rotating while nipping a light and heat sensitive recording material 12S, the light and heat sensitive recording material 12S is pulled out from the accommodating section 14. The light and heat sensitive recording material 12S which has been pulled out from the accommodating section 14 is conveyed with the conveying direction thereof along the way being bent substantially 90° upward, such that the light and heat sensitive recording material 12S is supplied to the light recording section 16 disposed at the conveying direction downstream side.

The light recording section 16 is formed from the exposure unit 26 which is disposed so as to be fixed at the side of the conveying path and above the accommodating section 14, an exposure drum 80, and nip rollers 82, 84 which are disposed so as to be able to approach and move apart from the exposure drum 80. The nip rollers 82, 84 are disposed at the upstream side and the downstream side of the exposure position, with the exposure position of the exposure unit 26 being disposed therebetween. The exposure unit 26 is connected to the controller 10. Image signals read out from an image processing device (not shown) are stored in the controller 10. The light source section 28 within the exposure unit 26 is controlled to be lit on the basis of these image signals.

Figure 5A:
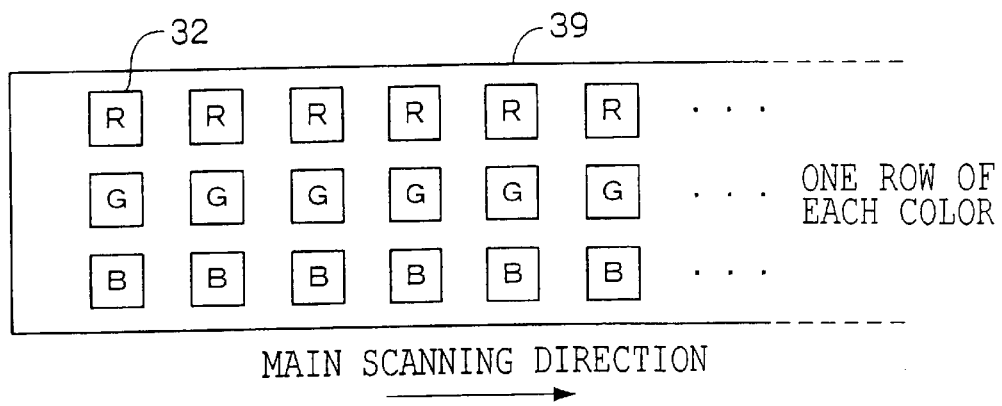
FIGS. 5A and 5B are diagrams showing arrangements of LEDs in a light recording section of the image recording device relating to the second embodiment.
Figure 6:
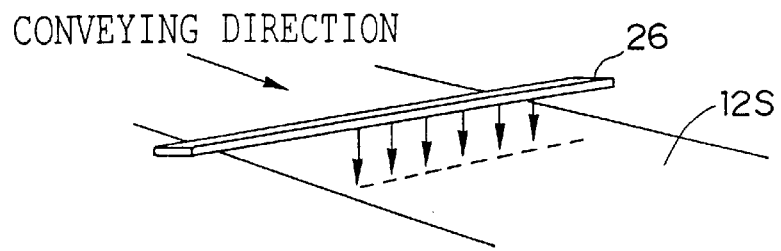
FIG. 6 is a schematic view showing a structure of the light recording section of the image recording device relating to the second embodiment.

The exposure unit 26 of the present embodiment is structured similarly to that of the first embodiment, except that, the exposure unit 26 of the present embodiment is fixed, and in the exposure unit 26, as shown in FIG. 6, plural groups of LEDs are aligned along the entire width of the light and heat sensitive recording material 12S along the main scanning direction, with one group being three LEDs (the LEDs 32R, 32G, 32B) aligned in the order of RGB along the subscanning direction on the substrate 39 as shown in FIG. 5A. Structures in the present embodiment which are the same as those of the first embodiment are denoted by the same reference numerals, and description thereof is omitted.

In the light recording section 16, a large number of light spots are focused on the light and heat sensitive recording material 12S by the light source section 28 having the above-described structure. The light and heat sensitive recording material 12S is held at the exposure position by the nip rollers 82, 84 and the exposure drum 80, is main scanned by the exposure unit 26, is conveyed by the nip rollers 82, 84 and the support drum 80, is subscanned in the direction opposite to the conveying direction, and is exposed from the recording surface side thereof such that a latent image is recorded thereon.

Figure 5B:
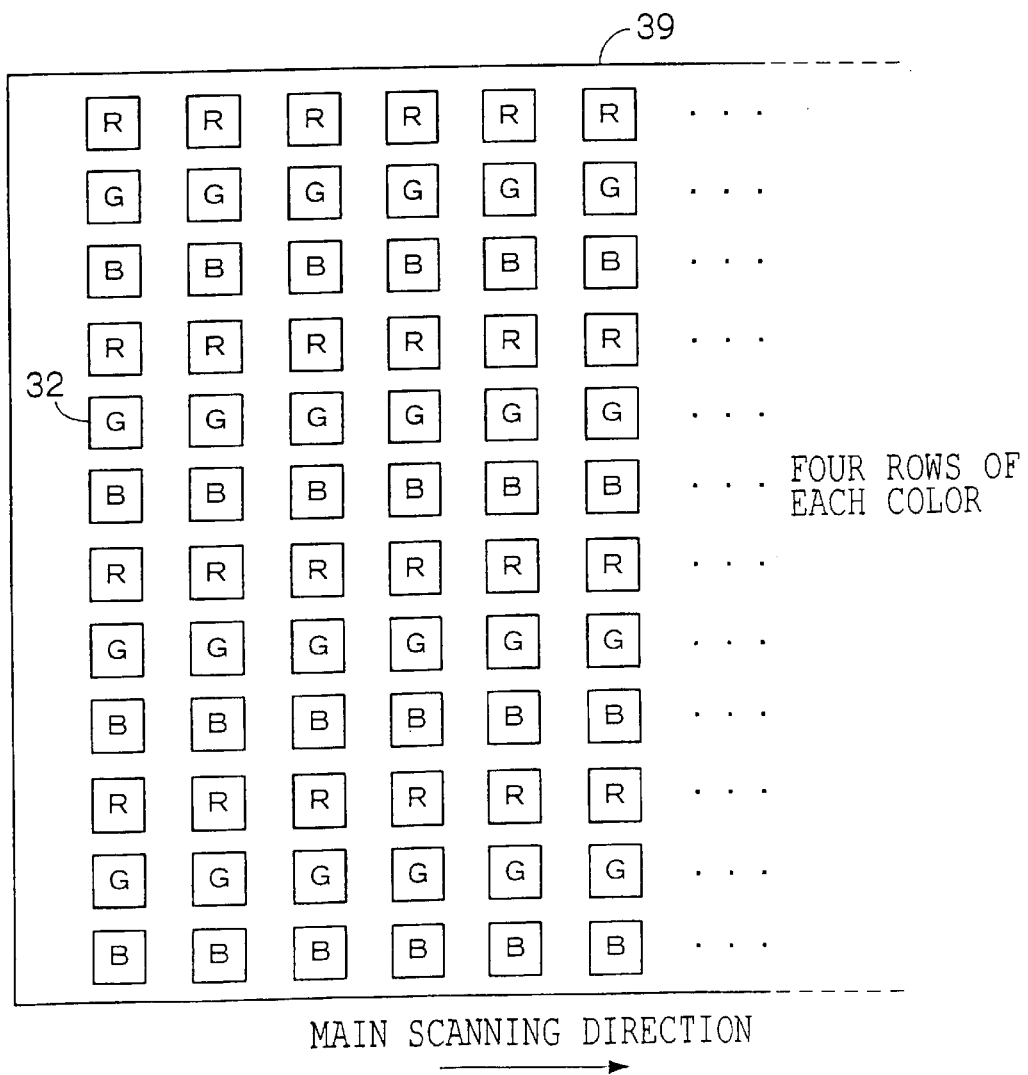

As shown in FIG. 5B, a plurality of the set of rows of FIG. 5A may be aligned along the subscanning direction. (In the present embodiment, four sets of rows are aligned along the subscanning direction.)

The pair of conveying rollers 64 is disposed at the conveying direction downstream side of the light recording section 16. The light and heat sensitive recording material 12S is nipped by the pair of conveying rollers 64, is conveyed with the conveying direction thereof along the way being bent substantially 90° to the left, and is supplied to the heat developing section 18 disposed at the conveying direction downstream side.

The heat developing section 18 is formed by a heating drum 86 and a pressing roller 88. The heating drum 86 is disposed beneath the conveying path, and serves as a heating device which heats the exposure surface side of the light and heat sensitive recording material 12. The pressing roller 88 is disposed so as to oppose the heating drum 86 with the light and heat sensitive recording material 12S disposed therebetween. A heat source such as a halogen lamp or the like is provided at the interior of the heating drum 86. Moreover, the heating drum 86 is controlled by a temperature control device (not shown) on the basis of output data from a temperature sensor (not shown) provided in a vicinity of the light and heat sensitive recording material 12S, such that the light and heat sensitive recording material 12S can be heated to a predetermined temperature. In the heat developing section 18, the light and heat sensitive recording material 12S is heated to a predetermined temperature by the heating drum 86, such that the latent image recorded on the light and heat sensitive recording material 12S is developed. Note that it is preferable that the heating temperature be in a similar range as that of the first embodiment.

The pair of conveying rollers 66 are disposed at the conveying direction downstream side of the heat developing section 18. The light and heat sensitive recording material 12S which has been heat developed is nipped by the pair of conveying rollers 66, is conveyed along the conveying path toward the left in FIG. 4, and is supplied to the light fixing section 20 which is disposed at the conveying direction downstream side.

The light fixing section 20 is formed from the fixing light sources 48A, 48B, 48C, 48D, which illuminate light toward the image forming surface of the light and heat sensitive recording material 12S which has been developed, and the reflecting plate 49 provided behind the fixing light sources 48A, 48B, 48C, 48D. The fixing light sources 48A, 48B, 48C, 48D are disposed beneath the conveying path. At the light fixing section 20, the light and heat sensitive recording material 12S is illuminated by light from the fixing light sources 48A, 48B, 48C, 48D, such that the developed image is fixed. Light sources which are similar to those of the first embodiment, with respect to the illumination intensity as well, can be used as the fixing light sources 48.

The pairs of conveying rollers 68, 69, 70, 72, 74 are disposed in order at the conveying direction downstream side of the light fixing section 20. The light and heat sensitive recording material 12S is nipped by the conveying roller pairs 68, 69, 70, 72, 74, and is conveyed with the conveying direction thereof bent upward by substantially 90° between the conveying roller pairs 69 and 70 and the conveying direction thereof bent substantially toward the left by 90° between the conveying roller pairs 72 and 74, such that the light and heat sensitive recording material 12S is supplied to the discharging section 22 disposed at the downstream side in the conveying direction.

The discharge tray 53 is provided at the outer side the discharge opening 22A of the discharging section 22. The light and heat sensitive recording material 12S, which has been subjected to the series of the processings of exposure, developing, and fixing, is discharged to the discharge tray 53 from the discharge opening 22A.

In this device, all of the processes of light recording onto the light and heat sensitive recording material, heat developing, and light fixing can be carried out by a single device. Further, in this device, developing is carried out by heat developing, and the developed image is fixed by light fixing. Therefore, the system does not require any processing solutions and can be made to be a completely dry system. Image receiving materials and the like are not needed, and waste materials are not generated. Further, the respective sections of the accommodating section, the light recording section, the heat developing section, the light fixing section and the like are disposed in the vertical direction, and the conveying path is curved. Thus, the device can be made more compact.

Because the exposure unit of the light recording section is fixed, the control system can be simplified. Further, there is no need to use a complex exposure system equipped with a polygon mirror or the like. Thus, the device can be made more compact. Further, the light and heat sensitive recording material can be exposed over the entire width thereof without moving the exposure unit of the light recording section. Thus, even higher speed image recording can be carried out.

In the first and second embodiments, the light emitting point of the exposure unit of the light recording section is formed by using LEDs which are self-luminous elements. However, the light emitting point may be formed by using another self-luminous element such as a semiconductor laser, an inorganic or organic electroluminescent element, a fluorescent display element or the like. A fluorescent display tube (VF), an electric field emission type fluorescent display tube (FED), a plasma type fluorescent display tube or the like can be used as the fluorescent display element. Further, the light emitting point can be structured by combining a light source and a transmittance converting element. A liquid crystal filter or a transmissive ferroelectric ceramic (such as a PLZT) array or the like may be used as the transmittance converting element in this case.

In the first and second embodiments, the ratio of the numbers of the LEDs of the respective colors is R:G:B= 1:1:1. However, this ratio differs in accordance with the types of LEDs which are used, and the ratio of the numbers can be set on the basis of the electric current—light emitting amount characteristic of each of the LEDs which are used.

Further, in the first and second embodiments, the fixing light source is provided separately from the recording light source of the light recording section. However, by effecting scanning exposure with light of the same wavelength as that of the recording light by using the exposure unit of the light recording section, light fixing can be carried out.

Figure 19A:
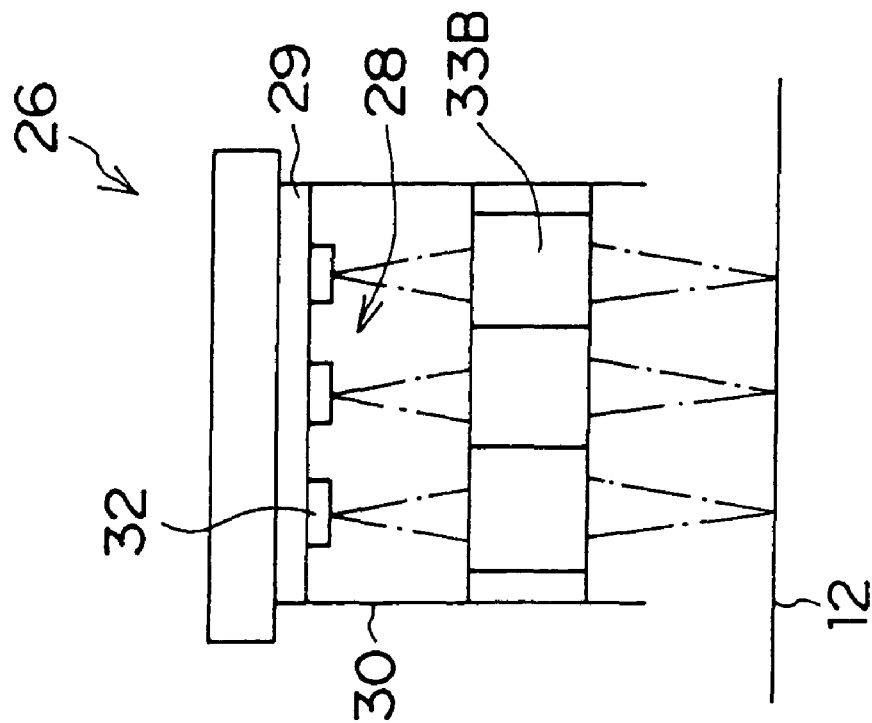
FIGS. 19A and 19B are schematic views showing a modified example of an exposure unit of the light recording section of the image recording device relating to the first embodiment.
Figure 19B:
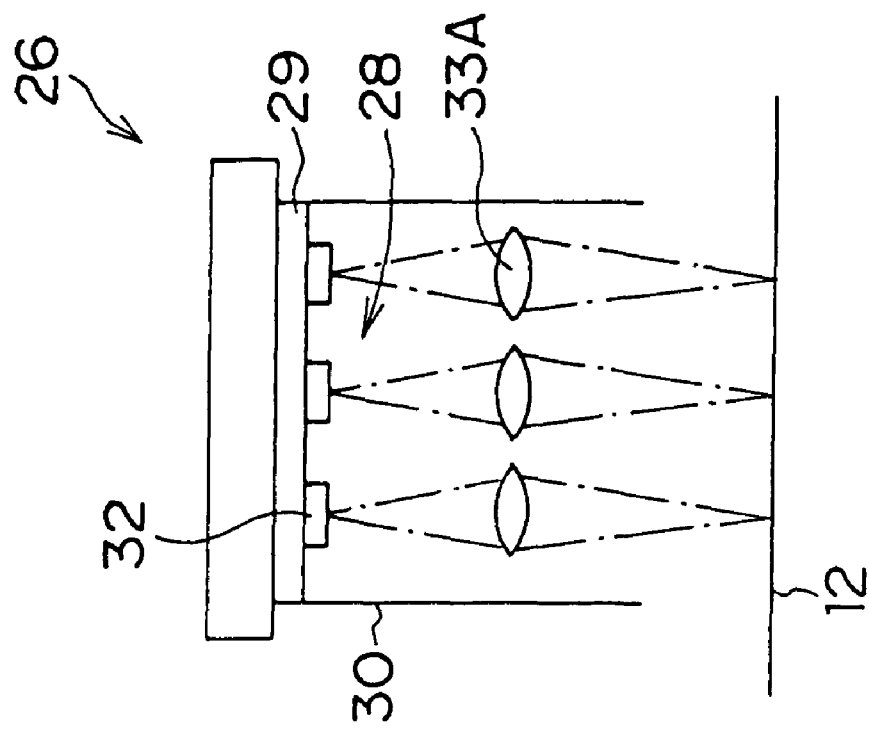

Further, in the first and second embodiments, the exposure unit of the light recording section is formed by disposing a single lens, which collects the light from the light source section, at the light emitting side of the light source section. However, as shown in FIG. 19A, a structure can be used which is equipped with a lens array 33A provided with a plurality of microlenses in correspondence with the respective LEDs 32 of the light source section 28. Further, as shown in FIG. 19B, a structure can be used which is equipped with a lens array 33B which is provided with a plurality of refractive index distribution type lenses (e.g., Selfoc lenses or the like) in correspondence with the LEDs 32 of the light source section 28.

(Third Embodiment)

Figure 7:
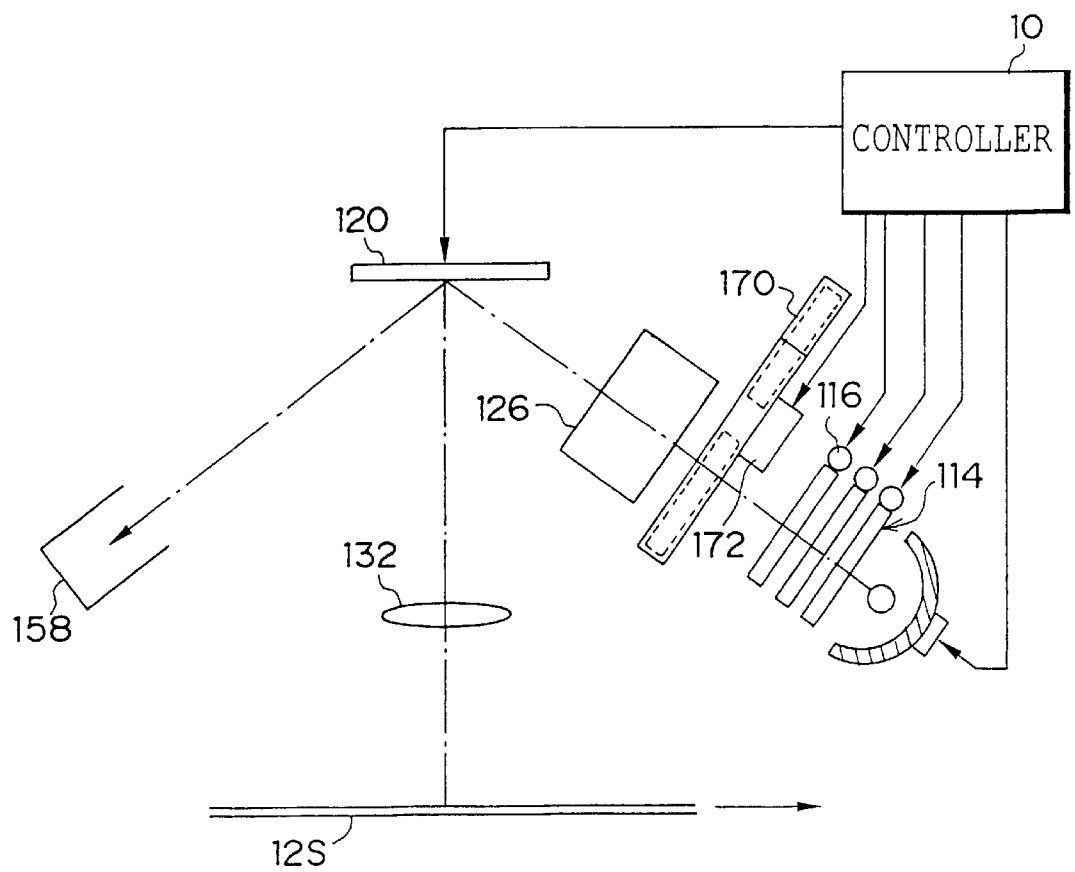
FIG. 7 is a schematic view showing a structure of a light recording section of an image recording device relating to a third embodiment.

In the first and second embodiments, examples are described in which an exposure unit equipped with a plurality of LEDs at the light source section is used in the light recording section. However, the third embodiment is an example in which, in place of this exposure unit, is used an exposure unit using a light source and a micromirror array equipped with a large number of micromirrors whose respective angles of reflection can be adjusted, and the angles of reflection of the micromirrors can be adjusted on the basis of image signals. Other than the light recording section 16, the image recording device relating to the third embodiment has the same structure as that of the first embodiment, and therefore, description of other structures will be omitted. FIG. 7 shows the schematic structure of the light recording section 16 of the image recording device relating to the third embodiment.

As shown in FIG. 7, the light recording section 16 is provided with a light source 112 which is formed by a halogen lamp and a reflector. Light adjusting filters 114 of the respective colors of R(red), G(green) and B(blue) are provided at the light emitting side of the light source 112. The light adjusting filters 114 are movable, independently of one another, in a direction of being inserted on the optical path and in a direction of being withdrawn from the optical path, by drivers 116 which are provided in correspondence with the respective filters. The drivers 116 of the light adjusting filters 114 are connected to the controller 10.

A turret 170, which is provided with color separating filters of the colors of R, G and B, is provided at the light exiting side of the color adjusting filters 114. The turret 170 is rotated by a driver 172 provided at the turret 170, such that the respective color separating filters can be inserted onto the optical path. The driver 172 of the turret 170 is connected to a controller 10. Note that the light source 112 may be made to be an LED light source which emits lights of the respective colors of R, G, B, and the light adjusting filters 114 and the turret 170 may be eliminated.

A diffusion box 126, which diffuses the light which passes through the color separating filters, is disposed at the light pass-through side of the color separating filters provided at the turret 170. A micromirror array 120 is provided at the light exiting side of the diffusion box 126. A light absorbing body 158 is disposed in a direction in which the light diffused in the diffusion box 126 is reflected by micromirrors 128 which are in an off state as will be described later.

As shown in FIG. 8, the micromirror array 120 is structured by micromirrors 128 being supported by supporting posts on an SRAM cell (memory cell) 130, and is a mirror device formed by a large number (from several hundreds of thousands to several millions) of pixels being arranged in a grid-like arrangement. To describe each of the pixels, as shown in FIG. 9, the micromirror 128 which is supported by the supporting post is provided at the topmost portion, and aluminum is deposited on the surface of the micromirror 128. Note that the reflectance of the micromirror is 90% or more. The SRAM cell 130 of a silicon gate CMOS, which is manufactured in an ordinary assembly line for semiconductor memories, is disposed directly beneath the micromirrors 128 via the supporting posts which include hinges and yokes. The micromirror array 120 is formed monolithically (integrally) on the whole.

Figure 9A:
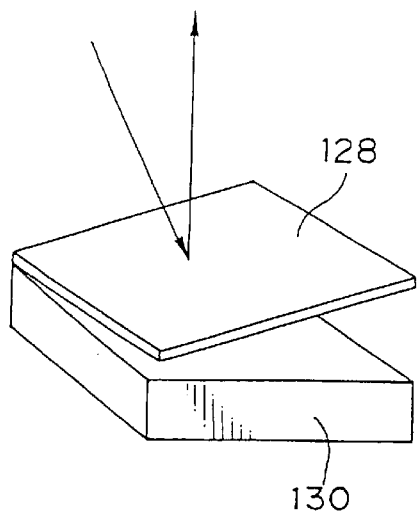
FIGS. 9A and 9B are diagrams for explaining operation of micromirrors forming the micromirror array.
Figure 9B:
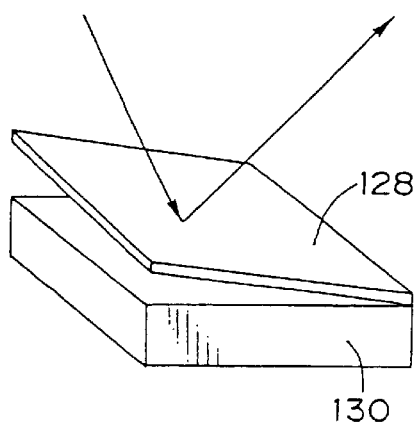

At the micromirror array 120, when a digital signal is written to the SRAM, the micromirror 128 supported by the supporting post is inclined around a diagonal line in a range of $\pm\alpha°$ (e.g., $\pm10°$) with respect to the substrate side at which the micromirror array 120 is disposed, such that the direction in which the light is reflected varies. Namely, by on/off controlling the respective micromirrors 128, the micromirrors 128 can be inclined $\pm\alpha°$, and thus, the micromirror array 120 can be used as a light switch. Note that FIG. 9A shows a state in which the micromirror 128 is inclined by $+\alpha°$ which is the on state, and FIG. 9B shows a state in which the micromirror 128 is inclined by $-\alpha°$ which is the off state.

Accordingly, by controlling the inclinations of the micromirrors 128 at the respective pixels of the micromirror array 120 in accordance with image signals as shown in FIG. 8, the light incident on the micromirror array 120 is reflected in the directions in which the respective micromirrors 128 are inclined. Note that FIG. 8 shows a portion of the micromirror array 120 in an enlarged manner, and illustrates an example of a state in which the micromirrors 128 are controlled to $+\alpha°$ or $-\alpha°$.

The on/off control of the respective micromirrors 128 is carried out by the controller 10 which is connected to the micromirror array 120. A collector lens 132, which focuses the light reflected by the micromirror array 120 onto the recording surface of the light and heat sensitive recording material 12, is disposed on the optical axis of the light reflected by the micromirror array 120.

At the light recording section 16, the light adjusting filters 114 are adjusted, and on the basis of the inputted image signals, the exposure amounts are computed by the controller 10. On the basis of the computed exposure amounts, the respective micromirrors 128 are on/off controlled. At this time, the greater the exposure amount, the longer the time that the micromirror 128 is on. The light, which is outputted from the light source 112 and is inputted to the micromirror array 120 via the light adjusting filters 114 and the diffusion box 126, is reflected toward the light and heat sensitive recording material 12 by the micromirror array 120 in a case in which the micromirror 128 is on, and is reflected toward the light absorbing body 158 by the micromirror array 120 in a case in which the micromirror 128 is off. The light which is reflected toward the light and heat sensitive recording material 12 is converged onto the recording surface of the light and heat sensitive recording material 12 by the collector lens 132 such that the light and heat sensitive recording material 12 is exposed from the recording layer side thereof and a latent image is recorded on the light and heat sensitive recording material 12.

At this time, the turret 170 is rotated such that the color separating filter for R color is set, and in accordance with the R color image signal, the micromirror array 120 is turned on and off such that exposure by R light is carried out. Thereafter, when, similarly and successively, the color separating filter for G color is set and exposure by G light is carried out and the color separating filter for B color is set and exposure by B light is carried out, exposure by the lights of the three colors of RGB can be carried out.

In the present device, image recording onto the light and heat sensitive recording material, heat developing, and light fixing can be carried out within a single device. Further, in this device, developing is carried out by heat developing, and the developed image is fixed by light fixing. Therefore, the system does not require any processing solutions and can be made to be a completely dry system. Image receiving materials and the like are not needed, and waste materials are not generated.

The exposure unit of the light recording section utilizes the micromirror array which is equipped with the large number of micromirrors. By adjusting the reflecting angles of the micromirrors on the basis of image signals, the light and heat sensitive recording material is exposed such that a latent image is recorded thereon. Therefore, there is no need to use a complex exposure system equipped with a polygon mirror or the like, there is no need to move the exposure unit in the main scanning direction and the subscanning direction, and there is no need to use a large number of light emitting points. Accordingly, the device can be made compact, and high speed image recording can be carried out.

In the above described first and third embodiments, a far infrared heater is used as the heating device, and in the second embodiment, the heating drum and the pressing roller are used as the heating device. However, the various heating devices illustrated in FIGS. 10 through 18 can be used. Moreover, in the first and second embodiments, the light and heat sensitive recording material 12 is heated from the exposure surface side thereof. However, the light and heat sensitive recording material may be heated from the support side thereof.

Figure 10:
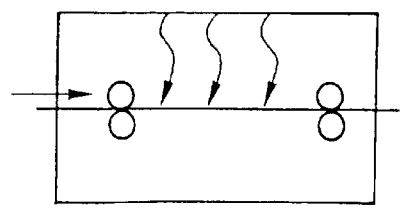
FIGS. 10 through 18 are schematic views showing examples of structures of other heating devices.
Figure 11:
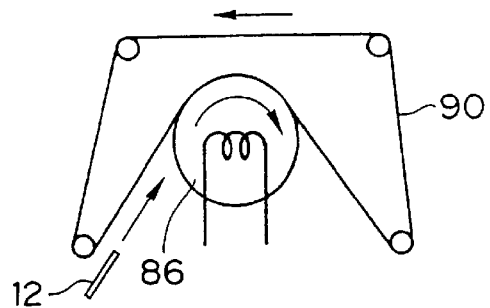
Figure 12:
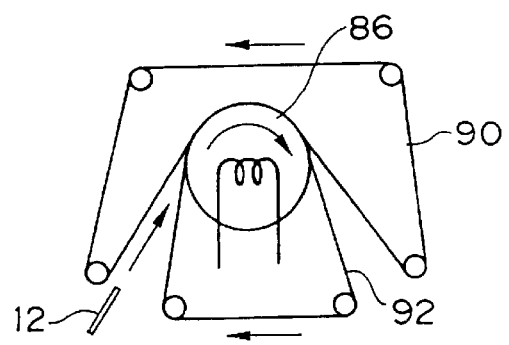

The heating device shown in FIG. 10 carries out heat development by blowing hot air. The heating device shown in FIG. 11 uses a pressing belt 90 as a pressing member, and carries out heat development by pressing the light and heat sensitive recording material 12 against the heating drum 86 by the pressing belt 90. Further, in the heating device illustrated in FIG. 12, a belt 92 is trained in a tense state around the heating drum 86 which is provided with a heat source at the interior thereof. The light and heat sensitive recording material 12 is pressed against the belt 92 by the pressing belt 90 such that heat developing is carried out.

Figure 13:
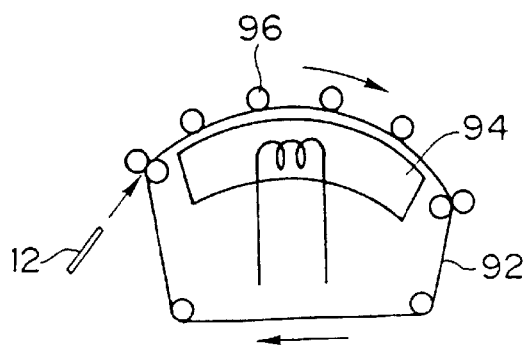
Figure 14:
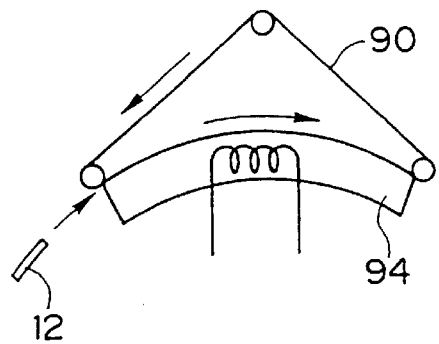

In the heating device illustrated in FIG. 13, the belt 92 is trained in a tense state around a convex plate heater 94. The light and heat sensitive recording material 12 is pushed against the belt 92 by pressing rollers 96 such that heat development is carried out. Further, in the heating device shown in FIG. 14, the pressing belt 90 is used as a pressing member, and heat development is carried out by the light and heat sensitive recording material 12 being pressed against the convex plate heater 94 by the pressing belt 90.

Figure 15:
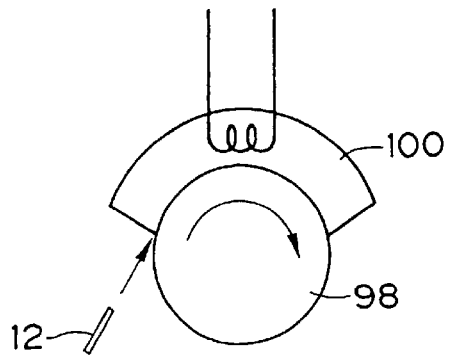
Figure 16:
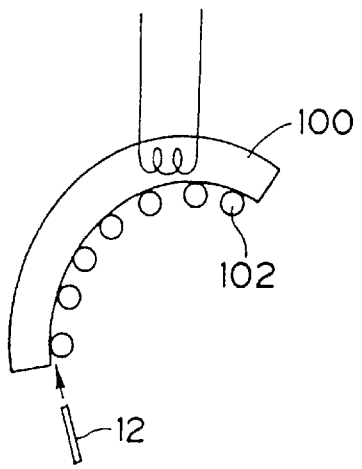

In the heating device shown in FIG. 15, a concave plate heater 100 is disposed along the periphery of a drum 98. The light and heat sensitive recording material 12 is pressed against the concave plate heater 100 by the drum 98 such that heat development is carried out. In the heating device shown in FIG. 16, a plurality of pressing rollers 102 serving as pressing members are aligned at the inner peripheral side of the concave plate heater 100. The light and heat sensitive recording material 12 is pressed against the concave plate heater 100 by the pressing rollers 102 such that heat development is carried out.

Figure 17:
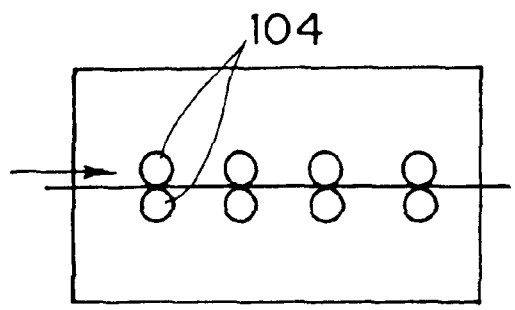
Figure 18:
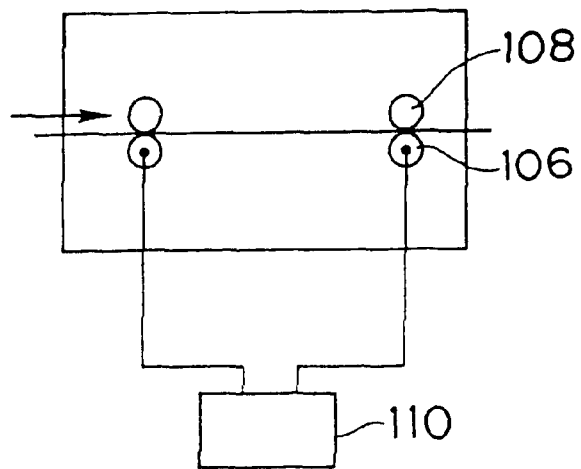

In the heating device shown in FIG. 17, a plurality of heating roller pairs 104 having heat sources at the interiors thereof are disposed along the conveying path. The light and heat sensitive recording material 12 is nipped by these heating roller pairs 104 and heat developed. Moreover, the heating device illustrated in FIG. 18 utilizes heating rollers 106 which generate heat when directly energized by a power source provided at the exterior. A plurality of roller pairs, each of which is formed by the heating roller 106 and a pressing roller 108, are disposed along the conveying path. The light and heat sensitive recording material 12 is nipped by the heating rollers 106 and the pressing rollers 108 so as to be heat developed.

Next, the light and heat sensitive recording material used in image recording in the image recording device of the present invention will be described. The light and heat sensitive recording material used in the present invention is provided with light and heat sensitive recording layers (image recording layers) on a support. The light and heat sensitive recording layers form a latent image by being exposed with light, and the latent image is developed by heating to form an image. In addition to the light and heat sensitive recording layers, the light and heat sensitive recording material may also include other known layers, such as a protective layer, an intermediate layer, a UV absorbing layer, and the like, at any position thereof. Further, by the light and heat sensitive recording material used in the present invention being provided with, on a support, at least three light and heat sensitive recording layers which contain a yellow color forming component, a magenta color forming component and a cyan color forming component, respectively, the light and heat sensitive recording material can be used as a color light and heat sensitive recording material in color image formation. Further, if needed, a light and heat sensitive recording layer containing a black color forming component may be included.

The present invention can optimally use a light and heat sensitive recording material provided with (a) a light and heat sensitive recording layer containing heat-responsive microcapsules encapsulating a color forming component A, and at the outer side of the microcapsules, a photopolymerizable composition formed from at least a photopolymerization initiator and a substantially colorless compound B having in the same molecule a polymerizable group and a moiety which forms color by the reaction with the color forming component A; (b) a light and heat sensitive recording layer containing heat-responsive microcapsules encapsulating a color forming component A, and at the outer side of the microcapsules, a photopolymerizable composition formed from at least a substantially colorless compound C which forms color by the reaction with the color forming component A, a photopolymerizable compound D, and a photopolymerization initiator; (c) a light and heat sensitive recording layer containing heat-responsive microcapsules encapsulating a color forming component A, and at the outer side of the microcapsules, a photopolymerizable composition formed from at least a substantially colorless compound C which forms color by the reaction with the color forming component A, a photopolymerizable compound Dp having a moiety which suppresses the reaction between the color forming component A and the compound C, and a photopolymerization initiator; or (d) a light and heat sensitive recording layer containing heat-responsive microcapsules encapsulating a substantially colorless compound C which forms color by the reaction with the color forming component A, and at the outer side of the microcapsules, a photopolymerizable composition formed from at least the color forming component A, a photopolymerizable compound D, and a photopolymerization initiator.

In the light and heat sensitive recording layer (a), by effecting exposure in a desired image shape, the photopolymerizable composition which is outside of the microcapsules effects a polymerization reaction due to the radicals generated from the photopolymerization initiator, and hardens, such that a latent image of the desired image shape is formed. Next, due to heating, the compound B which exists in the unexposed portions migrates in the recording material and reacts with the color forming component A in the capsules such that color is formed. Accordingly, the light and heat sensitive recording layer (a) is a positive light and heat sensitive recording layer in which the exposed portions is not colored, and the portions at which the unexposed portions have not hardened form color to form an image. A specific example is the light and heat sensitive recording layer disclosed in Japanese Patent Application Laid-Open (JP-A) No. 3-87827 which contains, at the outside of the microcapsules, a compound having an electron accepting group and a polymerizable group in the same molecule, a photocurable composition containing a photopolymerization initiator, and an electron donating colorless dye encapsulated in microcapsules. In this light and heat sensitive recording layer, the photocurable composition at the outer side of the microcapsules hardens due to exposure such that a latent image is formed. Thereafter, the electron accepting compound existing within the unexposed portions moves into the recording material due to heating, and reacts with the electron donating colorless dye within the microcapsules such that color is formed. Accordingly, the hardened latent image portions of the exposed portions do not form color, and color is formed only at the portions which do not harden. A sharp positive image having high contrast can be formed.

In the above-described light and heat sensitive recording layer (b), by effecting exposure in a desired image shape, the photopolymerizable compound D is polymerized by radicals generated from the photopolymerization initiator which reacts by exposure with light, such that the film hardens and a latent image of the desired image shape is formed. The photopolymerizable compound D does not have a moiety which suppresses the reaction between the color forming component A and the compound C. Thus, upon heating, the compound C which exists in the unexposed portions migrate in the recording material, and reacts with the color forming component A within the capsules to form color. Accordingly, the light and heat sensitive recording layer (b) is a positive light and heat sensitive recording layer in which color is not formed at the exposed portions, and the uncured portions of the unexposed portions form color to form an image. A specific example is a light and heat sensitive recording layer containing an azomethine dye precursor encapsulated in microcapsules, a deblocking agent which generates an azomethine dye from the dye precursor, a photopolymerizable compound, and a photopolymerization initiator. In this light and heat sensitive recording layer, by exposure, the photopolymerizable compound at the outer side of the microcapsules polymerizes and is hardened such that a latent image is formed. Thereafter, upon heating, the deblocking agent existing at the unexposed portions migrate in the recording material, and reacts with the azomethine dye precursor within the microcapsules such that color is formed. Accordingly, the cured latent image portions of the exposed portions do not form color, and only the portions which are not hardened form color, such that a positive image is formed.

In the light and heat sensitive recording layer (c), by exposure with light in a desired image shape, the photopolymerizable compound Dp is polymerized by the radicals generated from the photopolymerization initiator which reacts by the exposure, such that the film is hardened, and a latent image of the desired image shape is formed. The photopolymerizable compound Dp has a moiety which suppresses the reaction between the color forming component A and the compound C. Thus, depending on the layer properties having the latent image therein (hardened portions) formed by exposure, the compound C migrates and reacts with the color forming component A within the capsules to form an image. Accordingly, the light and heat sensitive recording layer (c) is a negative light and heat sensitive recording layer in which the exposed portions form color such that an image is formed. A specific example is the light and heat sensitive recording layer disclosed in JP-A No. 4-211252 which contains, at the outside of the microcapsules, an electron accepting compound, a polymerizable vinyl monomer, and a polymerization initiator, as well as an electron donating colorless dye encapsulated within microcapsules. The mechanism of image formation in this light and heat sensitive recording layer is unclear, but is thought to be as follows. The vinyl monomer existing outside of the microcapsules is polymerized by exposure with light, and on the other hand, the electron accepting compound coexisting in the exposure portions is not taken-in at all into the formed polymer, and rather, the interaction thereof with the vinyl polymer is reduced so that the electron accepting compound exists in a state that the compound is mobile at a high diffusion rate. On the other hand, the electron accepting compound in the unexposed portions exists in a state that the compound is trapped by the coexisting vinyl polymer. Thus, upon heating, the electron accepting compound in the exposed portions preferentially migrates in the recording material, and reacts with the electron donating colorless dye within the microcapsules. The electron accepting compound at the unexposed portions does not pass through the capsule walls even if heated, and does not react with the electron donating colorless dye, and thus does not contribute to color formation. Accordingly, in this light and heat sensitive recording layer, an image is formed by the exposed portions forming color and the unexposed portions not forming color. Thus, a sharp negative image with high contrast can be formed.

In the light and heat sensitive recording layer (d), by effecting exposure in a desired image shape, the photopolymerizable compound D is polymerized by the radicals generated from the reacted photopolymerization initiator by exposure, and the film is cured such that a latent image of the desired image shape is formed. The photopolymerizable compound D does not have a moiety which suppresses reaction of the color forming component A with the compound C. Thus, upon heating, the color forming component A existing in the unexposed portions migrates in the recording material, and reacts with the compound C within the capsules to form color. Accordingly, the light and heat sensitive recording layer (d) is a positive light and heat sensitive recording layer in which an image is formed such that color is not formed in the exposed portions but is formed in the uncured portions in the unexposed portions.

Hereinafter, the structural components forming the light and heat sensitive recording layers (a) through (d) will be discussed. Examples of the color forming component A in the light and heat sensitive recording layers (a) through (d) are an electron donating colorless dye which is substantially colorless and a diazonium salt compound. For example, the electron donating colorless dyes disclosed in paragraphs [0051] through [0061] of Japanese Patent Application Laid-Open (JP-A) No. 2000-199952 can be used as the electron donating colorless dye. For example, the diazonium salt compounds disclosed in paragraphs [0062] through [0077] of Japanese Patent Application Laid-Open (JP-A) No. 2000-199952 can be used as the diazonium salt compound.

The substantially colorless compound B, which is used in the light and heat sensitive recording layer (a) and which has in the same molecule a polymerizable group and a moiety which forms color by the reaction with the color forming component A, may be any compound which has both functions of forming color by the reaction with the color forming component A and being polymerizable and curable by the reaction due to light, such as an electron accepting compound having a polymerizable group or a coupler compound having a polymerizable group. The electron accepting compound which has a polymerizable group, i.e., a compound having an electron accepting group and a polymerizable group in the same molecule, may be any compound which has a polymerizable group, and forms color by the reaction with an electron donating colorless dye which is one example of color forming component A, and which photopolymerizes such that the film thereof is hardened. For example, the electron accepting compounds disclosed in paragraphs [0079] through [0088] of Japanese Patent Application Laid-Open (JP-A) No. 2000-199952 can be used as the electron accepting compound having a polymerizable group. Further, for example, the coupler compounds disclosed in paragraphs [0089] through [0105] of Japanese Patent Application Laid-Open (JP-A) No. 2000-199952 can be used as the coupler compound having a polymerizable group.

In the light and heat sensitive recording layers (b) through (d), in place of the above-described compound B having a polymerizable group, the substantially colorless compound C which does not have a polymerizable group and which forms color by the reaction with color forming component A can be used as the compound which forms color by the reaction with the color forming component A. However, compound C does not have a polymerizable group, and is therefore used together with photopolymerizable compound D which does have a polymerizable group, because it is necessary to impart a film hardening effect due to photopolymerization to the recording layer. All electron accepting compounds or coupler compounds which do not have a polymerizable group can be used as the compound C. For example, the electron accepting compounds disclosed in paragraphs [0107] through [0111] of Japanese Patent Application Laid-Open (JP-A) No. 2000-199952 can be used as the electron accepting compound which does not have a polymerizable group. For example, the coupler compounds disclosed in paragraphs [0117] through [0126] of Japanese Patent Application Laid-Open (JP-A) No. 2000-199952 can be used as the coupler compound which does not have a polymerizable group.

A photopolymerizable monomer can be used as the photopolymerizable compound D. A photopolymerizable monomer having at least one vinyl group in the molecule can be used as the photopolymerizable monomer. Further, in a case in which a negative image is desired, the photopolymerizable compound Dp, which has a moiety which suppresses reaction of the color forming component A with the compound C, is used as the photopolymerizable compound. A photopolymerizable compound Dp which is appropriate in light of the compound C to be used, i.e., a specific photopolymerizable monomer (Dp1, Dp2), is selected and used as the photopolymerizable compound Dp. In a case in which an electron accepting compound which does not have a polymerizable group is used, it is used together with the specific photopolymerizable monomer Dp1. As the photopolymerizable monomer Dp1, it is preferable to use a photopolymerizable monomer which has the effect of suppressing the reaction between the electron donating colorless dye and the electron accepting compound, and which has at least one vinyl group in the molecule. For example, the photopolymerizable monomers disclosed in paragraphs [0112] through [0116] of Japanese Patent Application Laid-Open (JP-A) No.2000-199952 can be used as the photopolymerizable monomer Dp1. Further, in a case in which a coupler compound which does not have a polymerizable group is used, it is used together with the specific photopolymerizable monomer DP2. It is preferable that the photopolymerizable monomer Dp2 is a photopolymerizable monomer which is not a metal salt compound which has an acidic group having the effect of suppressing the coupling reaction. For example, the photopolymerizable monomers disclosed in paragraphs [0128] through [0131] of Japanese Patent Application Laid-Open (JP-A) No. 2000-199952 can be used as the photopolymerizable monomer Dp2.

In the light and heat sensitive recording layers (b) through (d), an azomethine dye precursor may be used as the color forming component A, and a deblocking agent, which generates an azomethine dye (forms color) by contact with the azomethine dye precursor, may be used as the compound C. Further, a negative image can be obtained by using, as the photopolymerizable compound, a photopolymerizable compound (Dp) having a moiety which suppresses the reaction between the azomethine dye precursor and the deblocking agent. For example, the azomethine dye precursors disclosed in paragraphs [0028] through [0106] of Japanese Patent Application No. 2000-18425 can be used as the azomethine dye precursor. Further, the deblocking agents disclosed in paragraphs [0143] through [0164] of Japanese Patent Application No. 2000-18425 can be used as the deblocking agent. Moreover, in the light and heat sensitive recording layer (a), an azomethine dye precursor can be used as the color forming component A, and a deblocking agent having a polymerizable group can be used as the compound B. For example, the deblocking agents disclosed in paragraphs [0233] through [0238] of Japanese Patent Application No. 2000-18425 can be used as the deblocking agent having a polymerizable group.

The following combinations (i) through (xv) are examples of other combinations of the color forming component A and the compound B or the compound C which forms a color upon reaction with the color forming component A. In the following combinations, the components are listed in the order of the color forming component A, followed by the compound B or the compound C.

(i) A combination of an organic acid metal salt such as silver behenate or silver stearate; and reducing agents such as protocatechuic acid, spiroindane, hydroxyquinone.

(ii) A combination of a long chain fatty acid iron salt such as iron (III) stearate, iron (III) myristate; and phenols such as tannic acid, gallic acid, ammonium salicylate.

(iii) A combination of an organic acid heavy metal salt such as nickel, cobalt, lead, copper, iron, mercury, and silver salt of acetic acid, stearic acid, palmitic acid; and an alkaline earth metal sulfide such as calcium sulfide, strontium sulfide, potassium sulfide, or a combination of the organic acid heavy metal salt and an organic chelate agent such as s-diphenylcarbazide and diphenylcarbazone.

(iv) A combination of a heavy metal sulfate such as a sulfate of silver, lead, mercury, sodium; and a sulfur compound such as sodium tetrathionate, sodium thiosulfate, thiourea.

(v) A combination of a fatty acid iron (III) salt such as iron (III) stearate; and an aromatic polyhydroxy compound such as 3,4-hydroxytetraphenylmethane.

(vi) A combination of an organic metal salt such as oxalate and mercury oxalate; and an organic polyhydroxy compound such as polyhydroxy alcohol, glycerin, glycol.

(vii) A combination of a fatty acid iron (III) salt such as iron (III) pelargonate, iron (III) laurate; and a thiocetylcarbamide or isothiocetylcarbamide derivative.

(viii) A combination of an organic acid lead salt such as lead caproate, lead pelargonate, lead behenate; and a thiourea derivative such as ethylene thiourea, N-dodecyl thiourea.

(ix) A combination of a higher fatty acid heavy metal salt such as iron (III) stearate, copper stearate; and zinc dialkyldithiocarbaminate.

(x) An oxazine forming combination dye such as a combination of resorcinol and a nitroso compound.

(xi) A combination of a formazane compound and a reducing agent and/or a metal salt.

(xii) A combination of an oxidation type color forming agent and an oxidizing agent.

(xiii) A combination of a phthalonitrile and a diiminoisoindoline (a combination which formes phthalocyanine).

(xiv) A combination of isocyanates and diiminoisoindolines (a combination which forms a coloring pigment).

(xv) A combination of a pigment precursor and an acid or base (a combination which generates a pigment).

Among the above described combinations of color forming components, the following combinations are preferable: a combination of an electron donating dye precursor and an electron accepting compound; a combination of a diazo compound and a coupler compound; a combination of a protected dye precursor and a deblocking agent; and a combination of an oxidant precursor of a paraphenylenediamine derivative or a paraaminophenol derivative and a coupler compound. Namely, the color forming component A is preferably an electron donating dye precursor, a diazo compound, a protected dye precursor or an oxidant precursor, and the compound B or the compound C is preferably an electron accepting compound, a coupler compound or a deblocking agent.

Next, the photopolymerization initiator used in the light and heat sensitive recording layers (a) through (d) will be discussed. The photopolymerization initiator is used in any of the light and heat sensitive recording layers (a) through (d), and due to light exposure, generates radicals to cause a polymerization reaction within the layer, and promotes this reaction. Due to this polymerization reaction, the recording layer film is cured, and a latent image of a desired image shape can be formed. The polymerization initiator preferably contains a spectral sensitizing compound having a wavelength of maximum absorption in the range of 300 to 1000 nm, and a compound which has interaction with the spectral sensitizing compound. However, if the compound which has interaction with the spectral sensitizing compound is a compound which has, in the structure thereof, both functions of a borate moiety and a dye moiety having a wavelength of maximum absorption in a range of 300 to 1000 nm, it suffices not use the spectral sensitizing dye. In the case of forming a color image, it is suitable to use a light and heat sensitive recording material which has light and heat sensitive recording layers containing photopolymerization initiators which contain these compounds. For example, the photopolymerizable monomers disclosed in paragraphs [0133] through [0179] of Japanese Patent Application Laid-Open (JP-A) No. 2000-199952 can be used as the photopolymerization initiator.

Other additives of the light and heat sensitive recording layers, layer structures other than the light and heat sensitive recording layers, and the microencapsulation methods disclosed in paragraphs [0180] through [0226] of Japanese Patent Application Laid-Open (JP-A) No.2000-199952 can be used with the above-described light and heat sensitive recording material.

In the present invention, in addition to the light and heat sensitive recording material having the above-described light and heat sensitive recording layers (a) through (d), a light and heat sensitive recording material can be used which is provided with the following photocurable light and heat sensitive recording layer whose irradiated portions are cured by being irradiated with light: (e) a light and heat sensitive recording layer containing an oxidant precursor E which is encapsulated in heat-responsive microcapsules, and outside of the heat-responsive microcapsules, an activating agent G which reacts with the oxidant precursor E to generate an oxidant F, and a dye forming coupler H which is involved in a coupling reaction with the oxidant F to form a dye; and (f) a light and heat sensitive recording layer containing the oxidant precursor E which is provided outside of heat-responsive microcapsules, and encapsulated within the microcapsules, an activating agent G which reacts with the oxidant precursor E to generate the oxidant F, and a dye forming coupler H which is involved in a coupling reaction with the oxidant F to form a dye.

When the light and heat sensitive recording layer (e), is exposed in a desired image shape, the portions irradiated with light are cured such that a latent image of the desired image shape is formed. Then, upon heating, the activating agent G present in the unexposed portions migarate in the recording material and reacts with the oxidant precursor E within the capsules to generate the oxidant F. The generated oxidant F undergoes in a coupling reaction with the dye forming coupler H to form a dye (form color). Accordingly, the light and heat sensitive recording layer (e) is a positive light and heat sensitive recording layer in which the exposed portions do not form a color and the uncured portions of the unexposed portions form color so as to form an image. A specific example is the light and heat sensitive recording layer disclosed in Japanese Patent Application Laid-open (JP-A) No. 2001-142204 which contains a dye forming coupler and an oxidant precursor of a paraphenylenediamine derivative or a paraaminophenol derivative encapsulated in microcapsules, and an activating agent which is outside the microcapsules, and reacts with the oxidant precursor to generate an oxidant of a paraphenylenediamine derivative or a paraaminophenol derivative, a photopolymerizable monomer, and a photopolymerization initiator. In this light and heat sensitive recording layer, upon exposure, the photopolymerizable monomer polymerizes and is hardened to form a latent image. Thereafter, upon heating, the activating agent present in the unexposed portions migrates in the recording material, and reacts with the oxidant precursor (oxidation product) of the paraphenylenediamine derivative or the paraaminophenol derivative in the microcapsules, such that an oxidant of the paraphenylenediamine derivative or the paraaminophenol derivative, which is a color forming developing agent within the microcapsules, is formed. This oxidant of the color forming developing agent reacts with the dye forming coupler in the microcapsules to form a color. Accordingly, the cured latent image portions in the exposed portions do not form color, and only the portions which are not cured form color, such that a sharp positive image having high contrast can be formed.

When the light and heat sensitive recording layer (f), is exposed in a desired image shape, the portions irradiated with light is cured such that a latent image of the desired image shape is formed. Then, upon heating, the oxidant precursor E present in the unexposed portions migrates in the recording material and reacts with the activating agent G within the capsules to form the oxidant F. The generated oxidant F undergoes coupling reaction with the dye forming coupler H to form a dye (form color). Accordingly, the light and heat sensitive recording layer (f) is a positive light and heat sensitive recording layer in which the exposed portions do not form a color and the uncured portions in the unexposed portions form color so as to form an image. A specific example is the light and heat sensitive recording layer disclosed in Japanese Patent Application No, 2000-199952 which contains, an oxidant precursor of a paraphenylenediamine derivative or a paraaminophenol derivative which is present outside the microcapsules, and an activating agent which is encapsulated within the microcapsules, and reacts with the oxidant precursor to generate an oxidant of a paraphenylenediamine derivative or a paraaminophenol derivative, and a dye forming coupler, a photopolymerizable monomer, and a photopolymerization initiator. In this light and heat sensitive recording layer, upon exposure, the photopolymerizable monomer polymerizes and hardens, and a latent image is formed. Thereafter, upon heating, the oxidant precursor of the paraphenylenediamine derivative or the paraaminophenol derivative present in the unexposed portions migrates in the recording material and reacts with the activating agent within the microcapsules. An oxidant of the paraphenylenediamine derivative or the paraaminophenol derivative, which is a color forming developing agent within the microcapsules, is generated. This oxidant of the color forming developing agent reacts with the dye forming coupler in the microcapsules to form a color. Accordingly, the hardened latent image portions in the exposed portions are colored, and only the portions which are not hardened form color, such that a sharp positive image having high contrast can be obtained.

Hereinafter, the structural components of the light and heat sensitive recording layers (e), (f) will be discussed. The oxidant F which is generated in the light and heat sensitive recording layers (e), (f) is an oxidant(oxidation product) of a color forming developing agent. For example, the compounds disclosed in paragraphs [0009] through [0024] of Japanese Patent Application No, 2000-199952 can be used as the oxidant precursor E. For example, the compounds disclosed in paragraphs [0024] through [0032] of Japanese Patent Application No, 2000-199952 can be used as the activating agent G. Further, for example, the compounds disclosed in paragraph [0033] of Japanese Patent Application No, 2000-199952 can be used as the dye forming coupler H.

In the same way as with the light and heat sensitive recording layers (b) through (d), by adding the photopolymerizable compound D and a photopolymerization initiator to the light and heat sensitive recording layers (e), (f), a photocurable light and heat sensitive recording layer can be obtained. Further, a photocurable light and heat sensitive recording layer can be formed in such a manner that one of the oxidant precursor E, the activating agent G and the dye forming coupler H has a polymerizable group. Further, by using the photopolymerizable compound Dp, which has a high interactivity with one of the oxidant F and the dye forming coupler H, as the photopolymerizable compound, a negative image can be obtained. The same photopolymerizable compounds D and photopolymerization initiators as used in the light and heat sensitive recording layers (b) through (d) can be used.

Other additives for the light and heat sensitive recording layers, layer structures other than the light and heat sensitive recording layers, and the microencapsulation methods disclosed in paragraphs [0180] through [0226] of Japanese Patent Application Laid-Open (JP-A) No. 2000-199952 can be used with the above-described light and heat sensitive recording layers, in the same way as with the light and heat sensitive recording layers (a) through (d).

In accordance with the present invention, an image can be recorded with a completely dry system, and waste materials are not generated at the time of image recording. Further, at the light recording section, exposure is carried out by an exposure light source equipped with a plurality of light emitting points, such that a latent image is recorded. Thus, there is no need for a complex exposure system, and the device can be made compact, and high speed image recording can be carried out.

What is claimed is:

1. An image recording device for recording an image onto a light and heat sensitive recording material, the device comprising:
   (a) a conveying mechanism which conveys a light and heat sensitive recording material in a predetermined direction;
   (b) a light recording section including an exposure light source including a plurality of light emitting points aligned along a direction substantially orthogonal to the predetermined direction, the light recording section subjecting the light and heat sensitive recording material to light from the exposure light source to form a latent image on the light and heat sensitive recording material;
   (c) a heat development section which develops the latent image of the light and heat sensitive recording material by heating the light and heat sensitive recording material; and
   (d) a light fixing section for fixing the developed image of the light and heat sensitive recording material by irradiating light onto the light and heat sensitive recording material, the light fixing section being disposed downstream from the heat developing section in the conveyance direction of the light and heat sensitive recording material.

2. An image recording device according to claim 1, wherein the plurality of light emitting points of the exposure light source of the light recording section, includes a plurality of rows aligned along the predetermined direction.

3. An image recording device according to claim 1, wherein the light source of the light recording section is movably mounted so as to be movable along the direction substantially orthogonal to the predetermined direction.

4. An image recording device according to claim 1, wherein the light source is fixed, and the light and heat sensitive recording material includes a width in the direction substantially orthogonal to the predetermined direction, and the light emitting points of the light source of the light recording section extend along the entire width of the light and heat sensitive recording material.

5. An image recording device according to claim 1, wherein the light fixing section includes another light source provided separately from the exposure light source of the light recording section, said another light source being for irradiating light onto the developed image at the light fixing section.

6. An image recording device according to claim 1, wherein each light emitting point comprises a self-luminous element.

7. An image recording device according to claim 6, wherein the self-luminous element is one of a light emitting diode, an inorganic or organic electroluminescent element, a semiconductor laser, and a fluorescent display element.

8. An image recording device according to claim 1, wherein the exposure light source comprises a light source and a transmittance converting element.

9. An image recording device according to claim 8, wherein the transmittance converting element comprises one of a liquid crystal and a transmissive ferroelectric ceramic array.

10. An image recording device for recording an image corresponding to an image signal, onto a light and heat sensitive recording material, the device comprising:
   (a) a light recording section including a light source and a micromirror array comprising a plurality of micromirrors, the micromirrors including adjustable angles of reflection, which the light recording section adjusts on the basis of an image signal for exposing a light and heat sensitive recording material to form a latent image on the light and heat sensitive recording material corresponding to the image signal;
   (b) a heat developing section which subjects the light and heat sensitive recording material to heat to develop the latent image of the light and heat sensitive recording material; and
   (c) a light fixing section which irradiates the developed image of the light and heat sensitive recording material to fix the developed image, the light fixing section being disposed downstream from the heat developing section in the conveyance direction of the light and heat sensitive recording material.

11. An image recording device according to claim 10, wherein the light and heat sensitive recording material includes a width, and the micromirrors are aligned in a grid-like manner along the entire width of the light and heat sensitive recording material.

12. An image recording device according to claim 10, wherein each of the micromirrors can be independently adjusted to one of an angle at which light from the light source is directed toward the light and heat sensitive recording material, and an angle at which the light from the light source is directed away from the light and heat sensitive recording material.

13. An image recording device according to claim 12, wherein an exposure amount of each micromirror is controlled by time for holding the micromirror at the angle at which the light from the light source is directed toward the light and heat sensitive recording material.

14. An image recording device for recording an image onto a light and heat sensitive recording material, the device comprising:
   (a) an accommodating section which accommodates a light and heat sensitive recording material;
   (b) a discharging section which discharges the light and heat sensitive recording material for which recording has been completed;
   (c) a conveyer, including conveying path joining the accommodating section and the discharging section, and along which the conveyers conveys light and heat sensitive recording material from the accommodating section to the discharging section;
   (d) a light recording section provided between the accommodating section and the discharging section, and positioned to oppose the light and heat sensitive recording material along at least a portion of the conveying path;
   (e) a heat developing section provided between the light recording section and the discharging section, provided to oppose at least one side of the conveying path; and
   (f) a light fixing section provided between the heat developing section and the discharging section, provided to oppose the light and heat sensitive recording material along at least a section of the conveying path.

15. An image recording device according to claim 14, wherein the light recording section includes an exposure light source comprising a plurality of light emitting points aligned along at least one of a conveying direction and a direction substantially orthogonal to the conveying direction, the light recording section subjecting the light and heat sensitive recording material from light from the exposure light source to form a latent image on the light and heat sensitive recording material.

16. An image recording device according to claim 15, wherein the exposure light source is mounted movably in the direction substantially orthogonal to the conveying direction.

17. An image recording device according to claim 15, wherein the exposure light source comprises a plurality of self-luminous elements.

18. An image recording device according to claim 17, wherein the self-luminous elements comprise one of a light emitting diode, an inorganic or organic electroluminescent element, a semiconductor laser, and a fluorescent display element.

19. An image recording device according to claim 15, wherein the exposure light source includes a light source and a transmittance converting element.

20. An image recording device according to claim 19, wherein the transmittance converting element includes one of a liquid crystal and a transmissive ferroelectric ceramic array.

21. The image recording device of claim 1, wherein the light recording, and the heat development are performed in the absence of processing solutions and separate image receiving members.

22. The image recording device of claim 1, wherein solvents or aqueous solutions are substantially absent from said light fixing.

23. The image recording device of claim 10, wherein the light recording, and the heat development are performed in the absence of processing solutions and separate image receiving members.

24. The image recording device of claim 10, wherein solvents or aqueous solutions are substantially absent from said light fixing.

25. The image recording device of claim 14, wherein the light recording, and the heat development are performed in the absence of processing solutions and separate image receiving members.

26. The image recording device of claim 14, wherein solvents or aqueous solutions are substantially absent from said light fixing.

* * * * *